US011954048B2

(12) United States Patent
Parker et al.

(10) Patent No.: US 11,954,048 B2
(45) Date of Patent: Apr. 9, 2024

(54) VARIABLE NESTING CONTROL PARAMETER FOR TABLE STRUCTURE PROVIDING ACCESS CONTROL INFORMATION FOR CONTROLLING ACCESS TO A MEMORY SYSTEM

(71) Applicant: ARM LIMITED, Cambridge (GB)

(72) Inventors: Jason Parker, Sheffield (GB); Yuval Elad, Cambridge (GB); Alexander Donald Charles Chadwick, Cambridge (GB); Andrew Brookfield Swaine, Sheffield (GB); Carlos Garcia-Tobin, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/996,269

(22) PCT Filed: Apr. 14, 2021

(86) PCT No.: PCT/GB2021/050899
§ 371 (c)(1),
(2) Date: Oct. 14, 2022

(87) PCT Pub. No.: WO2021/214428
PCT Pub. Date: Oct. 28, 2021

(65) Prior Publication Data
US 2023/0205709 A1 Jun. 29, 2023

(30) Foreign Application Priority Data

Apr. 20, 2020 (GB) ...................... 2005700

(51) Int. Cl.
G06F 12/00 (2006.01)
G06F 12/14 (2006.01)

(52) U.S. Cl.
CPC ...... *G06F 12/1483* (2013.01); *G06F 12/1441* (2013.01); *G06F 12/145* (2013.01)

(58) Field of Classification Search
CPC . G06F 12/1483; G06F 12/1441; G06F 12/145
See application file for complete search history.

(56) References Cited

U.S. PATENT DOCUMENTS 6,785,790 B1    8/2004  Christie et al.
2005/0144422 A1 6/2005  McAlpine et al.
(Continued)

FOREIGN PATENT DOCUMENTS

EP   2318933 A1     5/2011
WO   2006/039057 A2 4/2006
(Continued)

OTHER PUBLICATIONS

Robert Bedichek, "Some Efficient Architecture Simulation Techniques", Department of Computer Science, FR-35 University of Washington, Seattle, Washington 98195, 1990.
(Continued)

Primary Examiner — Arvind Talukdar
(74) Attorney, Agent, or Firm — NIXON & VANDERHYE P.C.

(57) ABSTRACT

An apparatus has memory management circuitry to control access to a memory system based on access control information defined in table entries of a table structure comprising at least two levels of access control table. Table accessing circuitry accesses the table structure to obtain the access control information corresponding to a target address. For a given access control table at a given level of the table structure other than a starting level, the table accessing circuitry selects a selected table entry of the given access control table corresponding to the target address, based on an offset portion of the target address. A size of the offset
(Continued)

portion is selected based on a variable nesting control parameter specified in a table entry of a higher-level access control table at a higher level of the table structure than the given access control table.

20 Claims, 13 Drawing Sheets

(56) References Cited

U.S. PATENT DOCUMENTS

| | | | |
|---|---|---|---|
| 2006/0069899 A1* | 3/2006 | Schoinas | G06F 12/1036 |
| | | | 711/212 |
| 2007/0106875 A1 | 5/2007 | Mather | |
| 2009/0320048 A1 | 12/2009 | Watt et al. | |
| 2011/0023027 A1 | 1/2011 | Kegel et al. | |
| 2013/0339329 A1 | 12/2013 | Greiner et al. | |
| 2017/0192905 A1 | 7/2017 | Jermar | |
| 2018/0018278 A1 | 1/2018 | Bradbury et al. | |

FOREIGN PATENT DOCUMENTS

| | | |
|---|---|---|
| WO | 2010/010137 A1 | 1/2010 |
| WO | 2019/002817 A1 | 1/2019 |

OTHER PUBLICATIONS

"TrustZone® Address Space Controller (TZC-380)", Technical Reference Manual, 2008, 2010 ARM Limited.
"ARM Security Technology Building a Secure System using TrustZone® Technology", 2005-2009 ARM Limited.

* cited by examiner determining current domain

Page table entry formats:

VARIABLE NESTING CONTROL PARAMETER FOR TABLE STRUCTURE PROVIDING ACCESS CONTROL INFORMATION FOR CONTROLLING ACCESS TO A MEMORY SYSTEM

The present technique relates to the field of data processing. More particularly, it relates to memory management.

A data processing system may have memory management circuitry for controlling access to a memory system based on access control information defined in table entries of a table structure.

At least some examples provide an apparatus comprising: memory management circuitry to control access to a memory system based on access control information defined in table entries of a table structure comprising a plurality of levels of access control table; and table accessing circuitry to access the table structure to obtain the access control information corresponding to a target address; in which: for a given access control table at a given level of the table structure other than a starting level: the table accessing circuitry is configured to select a selected table entry of the given access control table corresponding to the target address, based on an offset portion of the target address, the selected table entry providing either a pointer to an access control table at a next lowest level of the table structure or the access control information corresponding to the target address; and the table accessing circuitry is configured to determine a size of the offset portion of the target address based on a variable nesting control parameter specified in a table entry of a higher-level access control table at a higher level of the table structure than the given access control table.

At least some examples provide a method comprising: controlling access to a memory system based on access control information defined in table entries of a table structure comprising a plurality of levels of access control table; and accessing the table structure to obtain the access control information corresponding to a target address; in which: for a given access control table at a given level of the table structure other than a starting level: a selected table entry of the given access control table corresponding to the target address is selected based on an offset portion of the target address, the selected table entry providing either a pointer to an access control table at a next lowest level of the table structure or the access control information corresponding to the target address; and a size of the offset portion of the target address is determined based on a variable nesting control parameter specified in a table entry of a higher-level access control table at a higher level of the table structure than the given access control table.

At least some examples provide a computer program comprising instructions which, when executed on a host data processing apparatus, control the host data processing apparatus to provide an instruction execution environment for execution of target code; the computer program comprising: memory management program logic to control access to simulated memory based on access control information defined in table entries of a table structure comprising a plurality of levels of access control table; and table accessing program logic to access the table structure to obtain the access control information corresponding to a target simulated address; in which: for a given access control table at a given level of the table structure other than a starting level: the table accessing program logic is configured to select a selected table entry of the given access control table corresponding to the target simulated address, based on an offset portion of the target simulated address, the selected table entry providing either a pointer to an access control table at a next lowest level of the table structure or the access control information corresponding to the target simulated address; and the table accessing program logic is configured to determine a size of the offset portion of the target simulated address based on a variable nesting control parameter specified in a table entry of a higher-level access control table at a higher level of the table structure than the given access control table.

At least some examples provide a computer-readable storage medium which stores the computer program described above. The storage medium may be a non-transitory storage medium.

BRIEF DESCRIPTION OF THE DRAWINGS

Further aspects, features and advantages of the present technique will be apparent from the following description of examples, which is to be read in conjunction with the accompanying drawings, in which.

DETAILED DESCRIPTION

Figure 1:
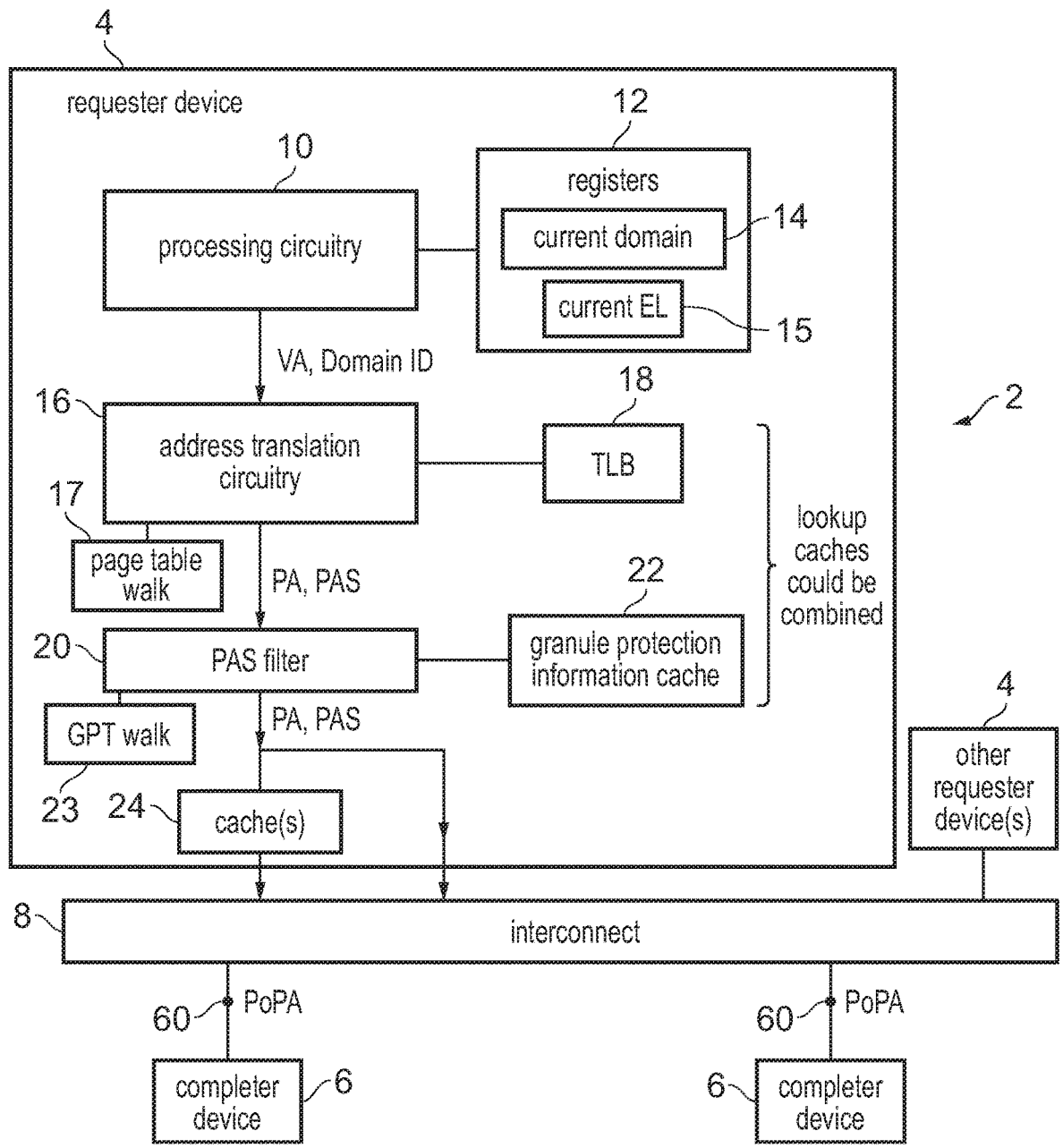
FIG. 1 illustrates an example of a data processing apparatus.

A data processing system may have memory management circuitry to control access to a memory system based on access control information defined in table entries of a table structure having two or more levels of access control table, and table accessing circuitry to access the table structure to obtain the access control information corresponding to a target address. The access control information may be any information used to control how accesses to a given region of addresses are performed or to control whether access to those regions are allowed at all. Although it would be possible to define such access control information in a single level of access control table which is linearly indexed based on the target address, when the size of the address space for which the access control information is to be defined becomes larger, such a linearly indexed table may be inefficient in terms of the memory usage for the table data itself, requiring a single contiguous region of memory to be reserved for the table which is proportional in size to the size of the address range to be protected by the table.

To make more efficient use of the address space (reducing the amount of memory storage allocated for the table), it is known to define a multi-level access control table, where at each level a portion of offset bits extracted from the target address selects an entry for the table at the current level, if the current level is not the final level, the entry at the current level provides a pointer to an access control table at a next lowest level of the table structure, and eventually after traversing various levels of the table structure, a final level of table is reached where the entry selected based on that level's offset portion of the target address provides the access control information which corresponds to the target address. This approach can allow the access control information for a certain number of regions of addresses distributed over a wider address space range to be protected to be implemented using a smaller memory footprint for the table data itself, compared to the approach described above using a single flat table which is linearly indexed. However, a multi-level table may reduce performance because obtaining the access control information for a particular target address may require multiple accesses to memory to traverse the various levels of the table structure to obtain several pointers to access control tables at the next level before finally identifying the access control information.

Normally, for a multi-level access control table, the way in which the nesting of the different levels of tables in the table structure is controlled is fixed by design, so that the maximum number of levels to be traversed to reach the entry providing the actual access control information, the size of the tables at each level, and sizes of the offset portions of the target address used to index into each level are all fixed.

In contrast, in the examples described below, a variable nesting control parameter may be specified in a table entry of a higher-level access control table, which provides variable control over how the offset portion for a lower level of the table structure is formed. Hence, for a given access control table at a given level of the table structure other than a starting level: the table accessing circuitry selects a selected table entry of the given access control table corresponding to the target address, based on an offset portion of the target address (the selected table entry providing either a pointer to an access control table at a next lowest level of the table structure or the access control information corresponding to the target address), and the table accessing circuitry determines a size of the offset portion of the target address based on a variable nesting control parameter specified in a table entry of a higher-level access control table at a higher level of the table structure than the given access control table.

This approach provides flexibility to trade off the memory footprint of the table against performance when accessing the table, by allowing the size of the offset portion used to select entries from a given level of access control table to be varied dynamically based on a parameter specified in a higher-level table entry (which would be accessed earlier in the path taken to traverse the table structure to reach the given access control table). Hence, rather than using a fixed size offset which depends only on the level of the table structure, the offset portion size also depends on the parameter read from an earlier access control table. Hence, if performance is more important than memory storage efficiency, the nesting can be adjusted to use a larger offset portion for a given level of the table structure, so that the bits of the target address are consumed in fewer levels allowing the access control information for the target address to be located in fewer memory accesses. On the other hand, if the priority is to provide a more efficient memory storage footprint for the table, the nesting control parameter can be defined in the higher level access control table so as to control the table accessing circuitry to select as a smaller offset for a given level of the table, so that a greater number of levels of the table structure are to be traversed to reach the access control information for the target address, allowing more fragmented allocation of memory for the table data with a smaller overall table footprint in memory.

The variable nesting control parameter may be specified separately in respective table entries of the higher-level access control table. This means that different table entries of the higher-level access control table may specify different values for the variable nesting control parameter. Hence, in the case where there are different table entries in the higher-level access control table specifying different values for the variable nesting control parameter, when selecting entries from access control tables at a given level of the table structure, the table accessing circuitry may use different sized offset portions for different access control tables at the same level of the table structure. This is particularly useful because different regions of the address space may have different requirements for whether or not performance or memory footprints is more important. Some parts of the address space may require the fastest access possible, while other parts may have looser performance requirements and so can present an opportunity for saving table area. By allowing the size of the offset portion used for selecting entries from access control tables to be determined based on parameters extracted from earlier entries at high levels of the table structure, this provides the flexibility for this trade-off.

The table structure may be considered as a tree structure, where the starting level table at the start level forms the root of the tree and each node of the tree branches into separate paths based on the respective pointers in entries of the table, eventually reaching leaf nodes which provide the access control information. The offset portions for each level extracted from the target address can be seen as selecting the particular path taken through the tree structure to reach the appropriate leaf node for that target address.

Based on the variable nesting control parameter, different parts of the tree structure may have different numbers of levels and different properties, rather than having a uniform pattern of nesting of access control tables across the entire table structure as is normally the case. Various properties of the table structure may be controlled based on the variable nesting control parameter.

For example, a maximum number of levels of the table structure to be traversed to reach the table entry providing the access control information for the target address may be variable depending on the variable nesting control parameter. This may be controlled based on the sizes of the offset portions selected at each level of the table, based on the variable nesting control parameter—by partitioning a given set of offset bits into fewer, larger, portions, the maximum number of levels of the table structure can be smaller than if that set of offset bits was partitioned into a larger number of smaller portions. Again, as different higher-level table entries may specify different values for the variable nesting control parameter, the maximum number of levels of the table structure may be different for different sub-trees within the overall tree structure represented by the table structure. Note that although the variable nesting control parameter may define the maximum number of levels of the table structure to be traversed, this does not necessarily mean that the table accessing circuitry will always need to traverse the specified maximum number of levels to reach the access control information. It is possible for an entry at a level other than the final level corresponding to the specified maximum number of levels to be defined as a block-descriptor entry which provides the access control information for a block of addresses which may be of a greater size than the block of addresses for which a block-descriptor table entry at the final level of the table structure would have defined the access control information.

Also, a table size occupied by the table data of a given access control table at a given level of the table structure may be variable, depending on the variable nesting control parameter obtained from the higher-level access control table. Again, the table size depends on the size of the offset portion of the target address. The table size corresponds to the product of the size of one table entry and a power of 2 corresponding to the number of bits used for the offset portion selected for the given level based on the variable nesting control parameter. When the apparatus is in use executing software, the software would need to allocate an address range corresponding to the table size for storing the table data of the respective table entries of the given access control table. Note that when a given access control table has a particular table size, this does not necessarily mean that valid table entries have been allocated for each entry within the portion of memory allocated for that particular table size. Nevertheless, a region of memory of the defined table size would need to be reserved for the access control table since if any other data was stored within that range then it could potentially be read when the table accessing circuitry is walking through the table structure to identify access control information for a particular target address, potentially leading to incorrect processing of the memory access request if the data stored at that entry is misinterpreted as access control information. With the use of the variable nesting control, it is possible to trade off the size of the table at a given part of the table structure so that for regions of memory where it is possible to allocate a relatively large chunk of memory in a contiguous block then the given access control table in that part of the table tree could be made larger so as to improve performance by allowing fewer hops between levels, while in other parts of the memory space where memory is more fragmented and there is not much space to allocate a single large table (or where the number of granules of addresses for which access control information needs to be defined is too small to justify allocation of a large table in memory), the variable nesting control parameter could be adjusted to provide smaller tables which would require a greater number of levels to traverse.

For a given access control table at a given level of the table structure, each table entry of that given access control table may define information which is applicable to a range of addresses at a given address range size. That is, the given address range size refers to the size of a given address range of target addresses for which that given access control table would be accessed when traversing a table structure to find the access control information for any target address within that given address range. The given address range size may also be variable depending on the variable nesting control parameter specified in the table entry of the higher-level access control table. That is, for a given level of the table structure, the size of the range of addresses to which a single table entry of that access control table is applicable to may vary depending upon the parameter read from a higher-level access control table. This is unconventional as normally each level of the table defines table entries which apply to a single fixed address range size fixed per level. Again, with the variable nesting control, one access control table at a given level of the table structure could define table entries each applicable to a given address range size that is a different size to the given address range size for each entry of another access control table at the same given level of the table structure.

In some examples the variable nesting control parameter could be specified at any level of the table structure other than the final level, so that it is possible for access control tables at a level other than the starting level of the table structure to vary how subsequent levels of access control table are nested.

However, in other examples the setting of the variable nesting control parameter may be restricted to the starting level of the table structure. Hence, the variable nesting control parameter may be specified in a table entry of a starting-level access control table at the starting level of the table structure, and this parameter may define the way in which the tables in the sub-tree under that particular starting-level table entry are nested for all subsequent levels. There may not be any further parameters in subsequent levels of the table structure which vary the nesting from that defined at the starting level. This approach may be more efficient for implementing the control hardware logic circuitry of the table accessing circuitry, as the selection of the size and position of the offset portion for a given level may depend on fewer parameters (there is no need to combine nesting control parameters read from multiple levels of the table).

Table entries in the table structure can be classed either as a block-descriptor table entry which provides the access control information for a corresponding block of target addresses, or as a table descriptor entry which provides a pointer to an access control table at a next level of the table structure. As mentioned above, it is possible to define block-descriptor table entries at any level of the table structure. If the block-descriptor table entry is at a level other than the maximum permitted level as defined by the variable nesting control parameter, then this means that a shared definition of the access control information is shared by a larger block of memory addresses than if the block-descriptor table entry is at the last level corresponding to the maximum number of levels indicated based on the variable nesting control parameter.

In one example, the block-descriptor table entry may comprise multiple access control information fields, each access control information field indicating the access control information for a different granule of addresses. Hence, when the block-descriptor table entry for a particular target address is reached, the access control information for that particular target address may be extracted from a particular one of the two or more access control information fields within the block-descriptor table entry. This approach can be useful if the amount of access control information required to be defined per granule is relatively small so that multiple sets of the access control information can be packed within a single memory location addressable in a single memory access translation. By packing multiple pieces of access control information for different granules into a single block-descriptor table entry, this can reduce the overall size of the table structure.

In one example, the table format may support the ability to specify a contiguity indication in the block-descriptor table entry. When the block-descriptor table entry specifies the contiguity indication, the table accessing circuitry may determine that the access control information for two or more different granules of addresses including the target granule corresponding to the required target address is represented by a shared set of access control information shared between the two or more different granules. This can be useful because if a shared set of access control information can represent information for more than one granule, then if a system supports caching of table entries in a translation lookaside buffer or other type of cache (e.g. the granule protection information cache described further below), this may mean that it is not necessary for the cache to store separate cache entries for the different granules. Instead, a single cache entry can indicate the shared set of access control information to be used for a larger number of granules. This can make more efficient use of the cached storage capacity effectively allowing the cache to store information for a greater number of granules than would be expected given the actual hardware storage provided.

The number of granules which share the shared set of access control information when the contiguity indication is specified may be variable, based on a contiguity size parameter specified in the block-descriptor table entry. This provides flexibility to vary the size of the contiguous block addresses which can be "fused" to share the same set of access control information.

The contiguity indication could be represented in different ways. In some cases, a dedicated contiguity indication field could be provided separate from the fields for indicating the access control information itself. However, in the example discussed above where the block-descriptor table entry has a number of separate access control information fields defining access control information for multiple granules, an efficient encoding of the contiguity indication can be to define a predetermined encoding of the access control information field which cannot be used for indicating any valid option for the access control information, and interpret that predetermined encoding of the access control information field as representing the contiguity indication. In this case, when a predetermined one of the access control information fields in the block-descriptor table entry has the predetermined encoding, this means that the table accessing circuitry determines that the shared set of access control information is indicated by one or more of the other access control information fields within that block-descriptor table entry, or that the shared set of access control information may even be represented in a completely different block-descriptor table entry from the one corresponding to the target address. By using an otherwise invalid encoding of the access control information field as the contiguity indication and exploiting the fact that other parts of the same block-descriptor table entry can represent the shared access control information, this avoids the need to allocate a separate field for the contiguity indication, providing a more efficient storage format for the table data.

The techniques discussed above can be used for different types of table structure used by memory management circuitry to control access to memory.

The technique of using the variable nesting control parameter can be particularly useful for table structures which are indexed by physical address, rather than virtual address. When the table structure is indexed by physical address, this means that the target address used to lookup the table structure (from which the offset portions are extracted for indexing into respective levels of the table) will be a physical address. The use of a variable nesting control parameter is particularly useful for physically-indexed access control table structures, because the physical address space tends to exhibit greater memory linearity than a virtual address space. That is, as the physical addresses more closely correspond to the physical regions of storage implemented in hardware than the virtual addresses, it is more likely that a relatively large block of adjacent physical addresses will have similar needs in terms of performance/memory footprint efficiency than for a block of adjacent virtual addresses of the same size. In contrast, a block of adjacent virtual addresses of a reasonably large size would be more likely to be fragmented across an assortment of different physical storage units or peripheral devices which have different needs for the performance/memory footprint trade-off. A table structure indexed by physical address rather than virtual address may also be referred as an inverted page table, and the technique discussed in this application is particularly useful for such inverted page tables, which provide information defined for respective granules of physical addresses.

One particular example of a physically indexed table structure may be a table used for isolation of respective physical address spaces. For example the memory management circuitry may comprise address translation circuitry to translate a target virtual address specified by a memory access request into a target physical address associated with a selected physical address space selected from among a plurality of physical address spaces; and filtering circuitry to determine whether the memory access request should be allowed to access the target physical address, based on whether the access control information obtained from the table structure indicates that the selected physical address space is an allowed physical address space for the target physical address.

Data processing systems may support use of virtual memory, where address translation circuitry is provided to translate a virtual address specified by a memory access request into a physical address associated with a location in a memory system to be accessed. The mappings between virtual addresses and physical addresses may be defined in one or more page table structures. The page table entries within the page table structures could also define some access permission information which may control whether a given software process executing on the processing circuitry is allowed to access a particular virtual address.

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support a number of distinct physical address spaces, where for at least some components of the memory system, memory access requests whose virtual addresses are translated into physical addresses in different physical address spaces are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed for some memory system components, this can provide a stronger security guarantee which does not rely on the page table permission information set by an operating system or hypervisor.

In a system in which a virtual address of a memory access request can be mapped to a physical address in one of two or more distinct physical address spaces, granule protection information can be used to limit which physical addresses are accessible within a particular physical address space. This can be useful for ensuring that certain physical memory locations implemented in hardware either on-chip or off-chip can be restricted for access within a particular physical address space or a particular subset of physical address spaces if desired.

Hence, the technique of varying the size of offset portions of the target address based on the variable nesting control parameter defined in a higher level table can be applied to the table which defines the granule protection information used to limit which physical addresses are accessible within a particular physical address space selected for a given memory access. Hence, the access control information described above may be granule protection information which defines which physical address spaces are allowed physical address spaces for the corresponding granule of physical addresses.

However, the variable nesting technique described above could also be used for table structures indexed by virtual address, such as page tables which provide address translation mappings used by address translation circuitry to translate a target virtual address into a target physical address.

Although allocation of virtual memory tends to be more fragmented so that it is more likely that using a fixed larger number of table levels may be more efficient to reduce table footprint in memory, nevertheless it is possible that there could be some regions where a larger table footprint can be tolerated to improve performance for certain regions storing performance-critical data which is to be accessed fast. Therefore, the techniques discussed above could be used to trade off the memory footprint of the table against the performance in traversing the table for those regions of the virtual address space where there is sufficient linearity that the number of levels could be reduced. Hence, defining variable sized offset portions for a given level based on the variable nesting control parameter in the higher-level access control table can also be applied to page tables or any other access control table structure indexed by virtual address. The access control information discussed above could comprise the addressing mapping information from the page tables used for address translation, and could also comprise other access permission information defined in the page tables, such as information defining whether a region of virtual addresses is readable/writable or should be read-only, or limiting which privilege/exception levels are allowed to access the region.

The techniques discussed above can be implemented in a hardware apparatus which has hardware circuitry logic for implementing the functions as discussed above. Hence, the memory management circuitry and the table accessing circuitry may comprise hardware circuit logic. However, in other examples a computer program for controlling a host data processing apparatus to provide an instruction execution environment for execution of target code may be provided with memory management program logic and table accessing program logic which performs, in software, equivalent functions to the memory management circuitry and the table accessing circuitry discussed above. This can be useful, for example, for enabling target code written for a particular instruction set architecture to be executed on a host computer which may not support that instruction set architecture.

Hence, functionality expected by the instruction set architecture which is not provided by the host computer could be emulated instead by simulation software providing an equivalent instruction execution environment for the target code as would be expected if the target code had been executed on the hardware device which actually supports the instruction set architecture. Hence, the computer program providing the simulation could include memory management program logic which controls access to simulated memory based on access control information defined in table entries of a table structure, and table accessing program logic to access the table structure (stored in the memory of the host data processing apparatus, but accessed by accesses specifying addresses in simulated memory which simulates the memory which a real target processing apparatus supporting the simulated instruction set architecture would have). As in the hardware device, the nesting of the table structure may be controlled based on the variable nesting control parameter to vary the size of offsets used at a given level of the table structure. For the approach where a simulation of the architecture is provided, the physical addresses resulting from any address translation and indexing into any physically-indexed table structure may be physical addresses within a simulated physical address space because they do not actually correspond to physical address spaces identified by hardware components of the host computer, but would be mapped to addresses within the virtual address space of the host.

Providing such a simulation can be useful for a range of purposes, for example for enabling legacy code written for one instruction set architecture to be executed on a different platform which supports a different instruction set architecture, or for assisting with software development of new software to be executed for a new version of an instruction set architecture when hardware devices supporting that new version of the instruction set architecture are not available yet (this can enable the software for the new version of the architecture to start to be developed in parallel with development of the hardware devices supporting the new version of the architecture).

FIG. 1 schematically illustrates an example of a data processing system 2 having at least one requester device 4 and at least one completer device 6. An interconnect 8 provides communication between the requester devices 4 and completer devices 6. A requester device is capable of issuing memory access requests requesting a memory access to a particular addressable memory system location. A completer device 6 is a device that has responsibility for servicing memory access requests directed to it. Although not shown in FIG. 1, some devices may be capable of acting both as a requester device and as a completer device. The requester devices 4 may for example include processing elements such as a central processing unit (CPU) or graphics processing unit (GPU) or other master devices such as bus master devices, network interface controllers, display controllers, etc. The completer devices may include memory controllers responsible for controlling access to corresponding memory storage units, peripheral controllers for controlling access to a peripheral device, etc. FIG. 1 shows an example configuration of one of the requester devices 4 in more detail but it will be appreciated that the other requester devices 4 could have a similar configuration. Alternatively, the other requester devices may have a different configuration to the requester device 4 shown on the left of FIG. 1.

The requester device 4 has processing circuitry 10 for performing data processing in response to instructions, with reference to data stored in registers 12. The registers 12 may include general purpose registers for storing operands and results of processed instructions, as well as control registers for storing control data for configuring how processing is performed by the processing circuitry. For example the control data may include a current domain indication 14 used to select which domain of operation is the current domain, and a current exception level indication 15 indicating which exception level is the current exception level in which the processing circuitry 10 is operating.

The processing circuitry 10 may be capable of issuing memory access requests specifying a virtual address (VA) identifying the addressable location to be accessed and a domain identifier (Domain ID or 'security state') identifying the current domain. Address translation circuitry 16 (e.g. a memory management unit (MMU)) translates the virtual address into a physical address (PA) through one of more stages of address translation based on page table data defined in page table structures stored in the memory system. Page table walk circuitry 17 controls issuing of page table walk memory access requests for requesting page table entries from the memory system, including generation of addresses of the page table entries based on a table base address defined in a base address register or provided by a pointer from a higher-level table entry and an offset portion extracted from a target address to be translated. A translation lookaside buffer (TLB) 18 acts as a lookup cache for caching some of that page table information for faster access than if the page table information had to be fetched from memory each time an address translation is required. In this example, as well as generating the physical address, the address translation circuitry 16 also selects one of a number of physical address spaces associated with the physical address and outputs a physical address space (PAS) identifier identifying the selected physical address space. Selection of the PAS will be discussed in more detail below.

A PAS filter 20 acts as requester-side filtering circuitry for checking, based on the translated physical address and the PAS identifier, whether that physical address is allowed to be accessed within the specified physical address space identified by the PAS identifier. This lookup is based on granule protection information stored in a granule protection table structure stored within the memory system. Granule protection table (GPT) walk circuitry 23 controls access to entries of the granule protection table structure in memory. Similar to the page table walk circuitry 17, the GPT walk circuitry 23 controls issuing of GPT walk memory access requests for requesting GPT entries from the memory system, including generation of addresses of the GPT entries based on a table base address defined in a base address register or provided by a pointer from a higher-level table entry and an offset portion extracted from a target address to be translated. The granule protection information may be cached within a granule protection information cache 22, similar to caching of page table data in the TLB 18. While the granule protection information cache 22 is shown as a separate structure from the TLB 18 in the example of FIG. 1, in other examples these types of lookup caches could be combined into a single lookup cache structure so that a single lookup of an entry of the combined structure provides both the page table information and the granule protection information. The granule protection information defines information restricting the physical address spaces from which a given physical address can be accessed, and based on this lookup the PAS filter 20 determines whether to allow the memory access request to proceed to be issued to one or more caches 24 and/or the interconnect 8. If the specified PAS for the memory access request is not allowed to access the specified physical address then the PAS filter 20 blocks the transaction and may signal a fault.

The address translation circuitry 16 and PAS filter 20 are examples of memory management circuitry. The page table walk circuitry 17 and GPT walk circuitry 23 are examples of table accessing circuitry.

While FIG. 1 shows an example with a system having multiple requester devices 4, the features shown for the one requester device on the left hand side of FIG. 1 could also be included in a system where there is only one requester device, such as a single-core processor.

While FIG. 1 shows an example where selection of the PAS for a given request is performed by the address translation circuitry 16, in other examples information for determining which PAS to select can be output by the address translation circuitry 16 to the PAS filter 20 along with the PA, and the PAS filter 20 may select the PAS and check whether the PA is allowed to be accessed within the selected PAS.

The provision of the PAS filter 20 helps to support a system which can operate in a number of domains of operation each associated with its own isolated physical address space where, for at least part of the memory system (e.g. for some caches or coherency enforcing mechanisms such as a snoop filter), the separate physical address spaces are treated as if they refer to completely separate sets of addresses identifying separate memory system locations, even if addresses within those address spaces actually refer to the same physical location in the memory system. This can be useful for security purposes.

Figure 2:
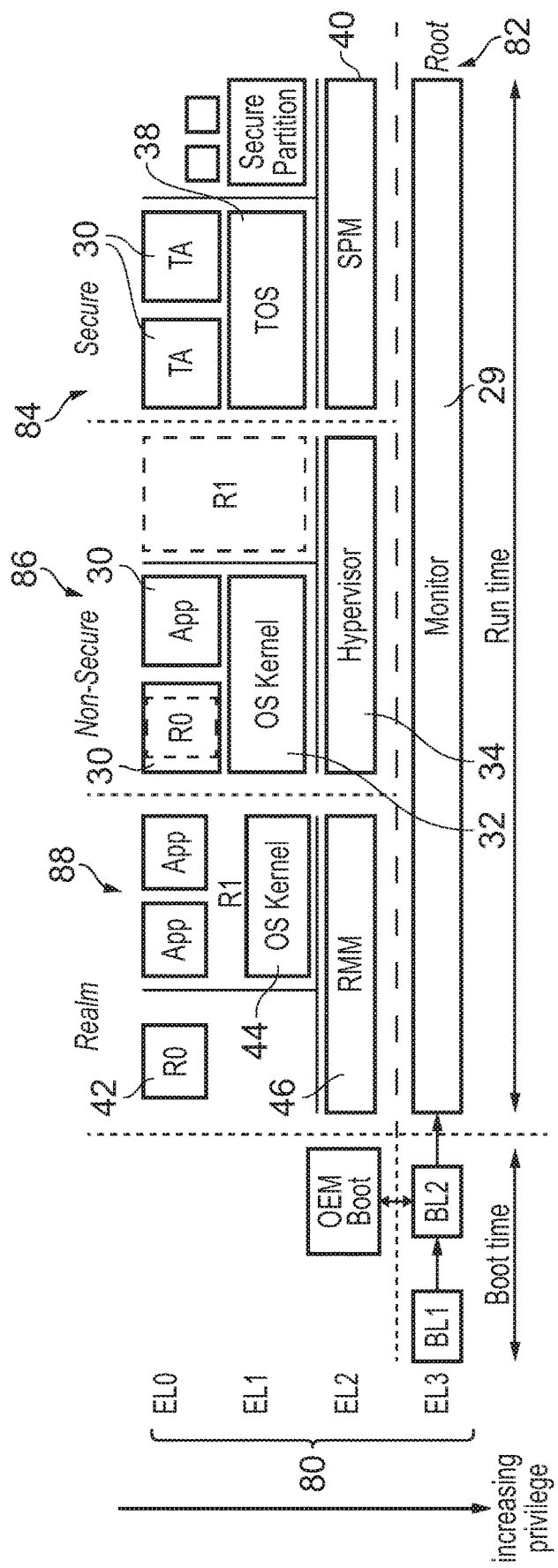
FIG. 2 illustrates a number of domains in which processing circuitry can operate.

FIG. 2 shows an example of different operating states and domains in which the processing circuitry 10 can operate, and an example of types of software which could be executed in the different exception levels and domains (of course, it will be appreciated that the particular software installed on a system is chosen by the parties managing that system and so is not an essential feature of the hardware architecture).

The processing circuitry 10 is operable at a number of different exception levels 80, in this example four exception levels labelled EL0, EL1, EL2 and EL3, where in this example EL3 refers to the exception level with the greatest level of privilege while EL0 refers to the exception level with the least privilege. It will be appreciated that other architectures could choose the opposite numbering so that the exception level with the highest number could be considered to have the lowest privilege. In this example the least privileged exception level EL0 is for application-level code, the next most privileged exception level EL1 is used for operating system-level code, the next most privileged exception level EL2 is used for hypervisor-level code which manages switching between a number of virtualised operating systems, while the most privileged exception level EL3 is used for monitor code which manages switches between respective domains and allocation of physical addresses to physical address spaces, as described later.

When an exception occurs while processing software in a particular exception level, for some types of exceptions, the exception is taken to a higher (more privileged) exception level, with the particular exception level in which the exception is to be taken being selected based on attributes of the particular exception which occurred. However, it may be possible for other types of exceptions to be taken at the same exception level as the exception level associated with the code being processed at the time an exception was taken, in some situations. When an exception is taken, information characterising the state of the processor at the time the exception was taken may be saved, including for example the current exception level at the time the exception was taken, and so once an exception handler has been processed to deal with the exception, processing may then return to the previous processing and the saved information can be used to identify the exception level to which processing should return.

In addition to the different exception levels, the processing circuitry also supports a number of domains of operation including a root domain 82, a secure (S) domain 84, a less secure domain 86 and a realm domain 88. For ease of reference, the less secure domain will be described below as the "non-secure" (NS) domain, but it will be appreciated that this is not intended to imply any particular level of (or lack of) security. Instead, "non-secure" merely indicates that the non-secure domain is intended for code which is less secure than code operating in the secure domain. The root domain 82 is selected when the processing circuitry 10 is in the highest exception level EL3. When the processing circuitry is in one of the other exception levels EL0 to EL2, the current domain is selected based on the current domain indicator 14, which indicates which of the other domains 84, 86, 88 is active. For each of the other domains 84, 86, 88 the processing circuitry could be in any of the exception levels EL0, EL1 or EL2.

At boot time, a number of pieces of boot code (e.g. BL1, BL2, OEM Boot) may be executed, e.g. within the more privileged exception levels EL3 or EL2. The boot code BL1, BL2 may be associated with the root domain for example and the OEM boot code may operate in the Secure domain. However, once the system is booted, at runtime the processing circuitry 10 may be considered to operate in one of the domains 82, 84, 86 and 88 at a time. Each of the domains 82 to 88 is associated with its own associated physical address space (PAS) which enables isolation of data from the different domains within at least part of the memory system. This will be described in more detail below.

The non-secure domain 86 can be used for regular application-level processing, and for the operating system and hypervisor activity for managing such applications. Hence, within the non-secure domain 86, there may be application code 30 operating at EL0, operating system (OS) code 32 operating at EL1 and hypervisor code 34 operating at EL2.

The secure domain 84 enables certain system-on-chip security, media or system services to be isolated into a separate physical address space from the physical address space used for non-secure processing. The secure and non-secure domains are not equal, in the sense that the non-secure domain code cannot access resources associated with the secure domain 84, while the secure domain can access both secure and non-secure resources. An example of a system supporting such partitioning of secure and non-secure domains 84, 86 is a system based on the TrustZone® architecture provided by Arm® Limited. The secure domain can run trusted applications 36 at EL0, a trusted operating system 38 at EL1, as well as optionally a secure partition manager 40 at EL2 which may, if secure partitioning is supported, use stage 2 page tables to support isolation between different trusted operating systems 38 executing in the secure domain 84 in a similar way to the way that the hypervisor 34 may manage isolation between virtual machines or guest operating systems 32 executing in the non-secure domain 86.

Extending the system to support a secure domain 84 has become popular in recent years because it enables a single hardware processor to support isolated secure processing, avoiding the need for the processing to be performed on a separate hardware processor. However, with the increasing popularity of use of the secure domain, many practical systems having such a secure domain now support, within the secure domain, a relatively sophisticated mixed environment of services which are provided by a wide range of different software providers. For example the code operating in the secure domain 84 may include different pieces of software provided by (among others): the silicon provider who manufactured the integrated circuit, an original equipment manufacturer (OEM) who assembles the integrated circuit provided by the silicon provider into an electronic device such as a mobile telephone, an operating system vendor (OSV) who provides the operating system 32 for the device; and/or a cloud platform provider who manages a cloud server supporting services for a number of different clients through the cloud.

However, increasingly there is a desire for parties providing user-level code (which might normally be expected to execute as applications 30 within the non-secure domain 86) to be provided with secure computing environments which can be trusted not to leak information to other parties operating code on the same physical platform. It may be desirable for such secure computing environments to be dynamically allocatable at runtime, and to be certified and attestable so that the user is able to verify whether sufficient security guarantee is provided on the physical platform, before trusting the device to process potentially sensitive code or data. A user of such software may not wish to trust the party providing a rich operating system 32 or hypervisor 34 which might normally operate in the non-secure domain 86 (or even if those providers themselves can be trusted, the user may wish to protect themselves against the operating system 32 or hypervisor 34 being compromised by an attacker). Also, while the secure domain 84 could be used for such user-provided applications needing secure processing, in practice this causes problems both for the user providing the code requiring the secure computing environment and for the providers of existing code operating within the secure domain 84. For the providers of existing code operating within the secure domain 84, the addition of arbitrary user-provided code within the secure domain would increase the attack surface for potential attacks against their code, which may be undesirable, and so allowing users to add code into the secure domain 84 may be strongly discouraged. On the other hand, the user providing the code requiring the secure computing environment may not be willing to trust all of the providers of the different pieces of code operating in the secure domain 84 to have access to its data or code, if certification or attestation of the code operating in a particular domain is needed as a prerequisite for the user-provided code to perform its processing, it may be difficult to audit and certify all of the distinct pieces of code operating in the secure domain 84 provided by the different software providers, which may limit the opportunities for third parties to provide more secure services.

Therefore, as shown in FIG. 2, an additional domain 88, called the realm domain, is provided which can be used by such user-introduced code to provide a secure computing environment orthogonal to any secure computing environment associated with components operating in the secure domain 24. In the realm domain, the software executed can include a number of realms, where each realm can be isolated from other realms by a realm management module (RMM) 46 operating at exception level EL2. The RMM 46 may control isolation between the respective realms 42, 44 executing the realm domain 88, for example by defining access permissions and address mappings in page table structures similar to the way in which hypervisor 34 manages isolation between different components operating in the non-secure domain 86. In this example, the realms include an application-level realm 42 which executes at EL0 and an encapsulated application/operating system realm 44 which executes across exception levels EL0 and EL1. It will be appreciated that it is not essential to support both EL0 and EL0/EL1 types of realms, and that multiple realms of the same type could be established by the RMM 46.

The realm domain 88 has its own physical address space allocated to it, similar to the secure domain 84, but the realm domain is orthogonal to the secure domain 84 in the sense that while the realm and secure domains 88, 84 can each access the non-secure PAS associated with the non-secure domain 86, the realm and secure domains 88, 84 cannot access each other's physical address spaces. This means that code executing in the realm domain 88 and secure domains 84 have no dependencies on each other. Code in the realm domain only needs to trust the hardware, the RMM 46 and the code operating in the root domain 82 which manages switching between domains, which means attestation and certification becomes more feasible. Attestation enables a given piece of software to request verification that code installed on the device matches certain anticipated properties. This could be implemented by checking whether a hash of the program code installed on the device matches an expected value that is signed by a trusted party using a cryptographic protocol. The RMM 46 and monitor code 29 could for example be attested by checking whether a hash of this software matches an expected value signed by a trusted party, such as the silicon provider who manufactured the integrated circuit comprising the processing system 2 or an architecture provider who designed the processor architecture which supports the domain-based memory access control. This can allow user-provided code 42, 44 to verify whether the integrity of the domain-based architecture can be trusted prior to executing any secure or sensitive functions.

Hence, it can be seen that the code associated with realms 42, 44, which would previously have executed in the non-secure domain 86 as shown by the dotted lines showing the gap in the non-secure domain where these processes would previously have executed, can now be moved to the realm domain where they may have stronger security guarantees because their data and code is not accessible by other code operating in a non-secure domain 86. However, due to the fact that the realm domain 88 and secure domain 84 are orthogonal and so cannot see each other's physical address spaces, this means that the providers of code in the realm domain do not need to trust the providers of code in the secure domain and vice versa. The code in the realm domain can simply trust the trusted firmware providing the monitor code 29 for the root domain 82 and the RMM 46, which may be provided by the silicon provider or the provider of the instruction set architecture supported by the processor, who may already inherently need to be trusted when the code is executing on their device, so that no further trust relationships with other operating system vendors, OEMs or cloud hosts are needed for the user to be able to be provided with a secure computing environment.

This can be useful for a range of applications and use cases, including for example mobile wallet and payment applications, gaming anti-cheating and piracy mechanisms, operating system platform security enhancements, secure virtual machine hosting, confidential computing, networking, or gateway processing for Internet of Things devices. It will be appreciated that users may find many other applications where the realm support is useful.

To support the security guarantees provided to a realm, the processing system may support an attestation report function, where at boot time or at run time measurements are made of firmware images and configuration, e.g. monitor code images and configuration or RMM code images and configuration and at runtime realm contents and configuration are measured, so that the realm owner can trace the relevant attestation report back to known implementations and certifications to make a trust decision on whether to operate on that system.

As shown in FIG. 2, a separate root domain 82 is provided which manages domain switching, and that root domain has its own isolated root physical address space. The creation of the root domain and the isolation of its resources from the secure domain allows for a more robust implementation even for systems which only have the non-secure and secure domains 86, 84 but do not have the realm domain 88, but can also be used for implementations which do support the realm domain 88. The root domain 82 can be implemented using monitor software 29 provided by (or certified by) the silicon provider or the architecture designer, and can be used to provide secure boot functionality, trusted boot measurements, system-on-chip configuration, debug control and management of firmware updates of firmware components provided by other parties such as the OEM. The root domain code can be developed, certified and deployed by the silicon provider or architecture designer without dependencies on the final device. In contrast the secure domain 84 can be managed by the OEM for implementing certain platform and security services. The management of the non-secure domain 86 may be controlled by an operating system 32 to provide operating system services, while the realm domain 88 allows the development of new forms of trusted execution environments which can be dedicated to user or third party applications while being mutually isolated from existing secure software environments in the secure domain 84.

Figure 3:
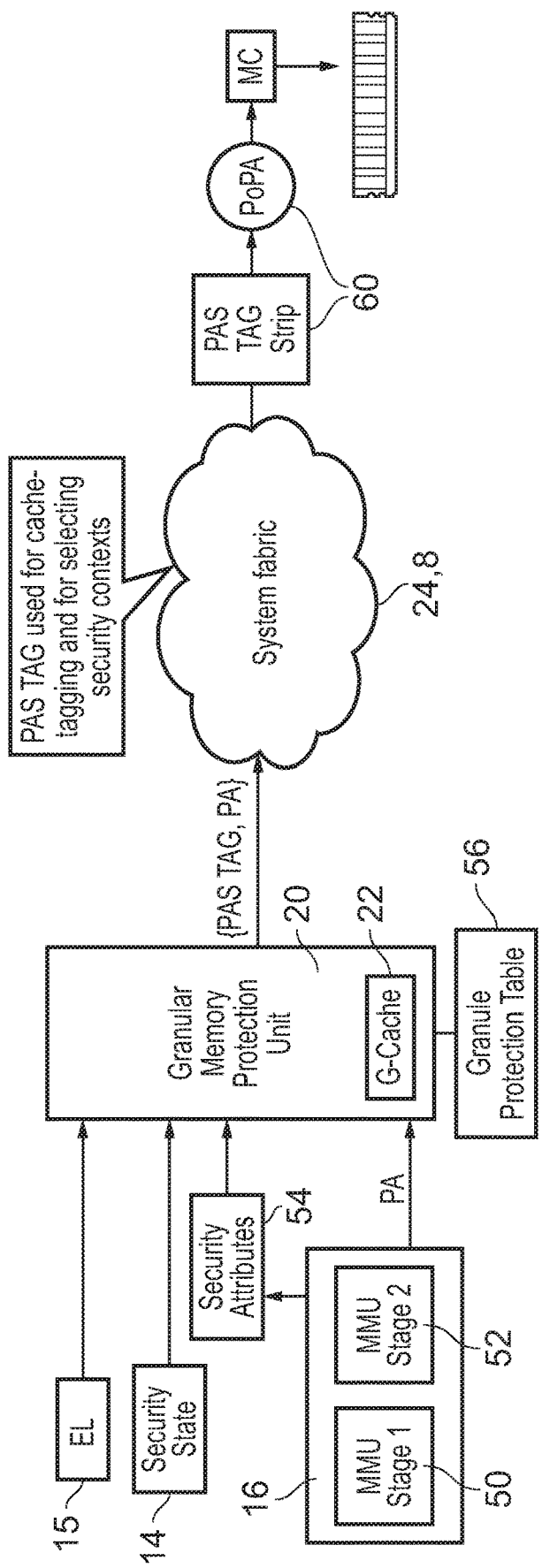
FIG. 3 illustrates an example of a processing system supporting granule protection lookups.

FIG. 3 schematically illustrates another example of a processing system 2 for supporting these techniques. Elements which are the same as in FIG. 1 are illustrated with the same reference numeral. FIG. 3 shows more detail in the address translation circuitry 16, which comprises stage 1 and stage 2 memory management units 50, 52. The stage 1 MMU 50 may be responsible for translating virtual addresses to either physical addresses (when the translation is triggered by EL2 or EL3 code) or to intermediate addresses (when the translation is triggered by EL0 or EL1 code in an operating state where a further stage 2 translation by the stage 2 MMU 52 is required). The stage 2 MMU may translate intermediate addresses into physical addresses. The stage 1 MMU may be based on page tables controlled by an operating system for translations initiated from EL0 or EL1, page tables controlled by a hypervisor for translations from EL2, or page tables controlled by monitor code 29 for translations from EL3. On the other hand, the stage 2 MMU 52 may be based on page table structures defined by a hypervisor 34, RMM 46 or secure partition manager 14 depending on which domain is being used. Separating the translations into two stages in this way allows operating systems to manage address translation for themselves and applications under the assumption that they are the only operating system running on the system, while the RMM 46, hypervisor 34 or SPM 40 may manage isolation between different operating systems running in the same domain.

As shown in FIG. 3, the address translation process using the address translation circuitry 16 may return security attributes 54 which, in combination with the current exception level 15 and the current domain 14 (or security state), allow section of a particular physical address space (identified by a PAS identifier or "PAS TAG") to be accessed in response to a given memory access request. The physical address and PAS identifier may be looked up in a granule protection table 56 which provides the granule protection information described earlier. In this example the PAS filter 20 is shown as a granular memory protection unit (GMPU) which verifies whether the selected PAS is allowed to access the requested physical address and if so allows the transaction to be passed to any caches 24 or interconnect 8 which are part of the system fabric of the memory system.

The GMPU 20 allows assigning memory to separate address spaces while providing a strong, hardware-based, isolation guarantee and providing spatial and temporal flexibility in the assignment methods of physical memory into these address spaces, as well as efficient sharing schemes. As described earlier, the execution units in the system are logically partitioned to virtual execution states (domains or "Worlds") where there is one execution state (Root world) located at the highest exception level (EL3), referred to as the "Root World" that manages physical memory assignment to these worlds.

A single System physical address space is virtualized into multiple "Logical" or "Architectural" Physical Address Spaces (PAS) where each such PAS is an orthogonal address space with independent coherency attributes. A System Physical Address is mapped to a single "Logical" Physical Address Space by extending it with a PAS tag.

A given World is allowed access to a subset of Logical Physical Address Spaces. This is enforced by a hardware filter 20 that can be attached to the output of the Memory Management Unit 16.

A World defines the security attributes (the PAS tag) of the access using fields in the Translation Table Descriptor of the page tables used for address translation. The hardware filter 20 has access to a table (Granule Protection Table 56, or GPT) that defines for each page in the system physical address space granule protection information (GPI) indicating the PAS TAG it is associated with and (optionally) other Granule Protection attributes.

The hardware filter 20 checks the World ID and the Security Attributes against the Granule's GPI and decides if access can be granted or not, thus forming a Granular Memory Protection Unit (GMPU).

The GPT 56 can reside in on-chip SRAM or in off-chip DRAM, for example. If stored off-chip, the GPT 56 may be integrity-protected by an on-chip memory protection engine that may use encryption, integrity and freshness mechanisms to maintain security of the GPT 56.

Locating the GMPU 20 on the requester-side of the system (e.g. on the MMU output) rather than on the completer-side allows allocating access permissions in page granularity while permitting the interconnect 8 to continue hashing/striping the page across multiple DRAM ports.

Transactions remain tagged with the PAS TAG as they propagate throughout the system fabric 24, 8 until reaching a location defined as the Point of Physical Aliasing 60. This allows to locate the filter on the Master-side without diminishing the security guarantees comparing to Slave-side filtering. As the transaction propagates throughout the system, the PAS TAG can be used as an in-depth security mechanism for address isolation: e.g. caches can add the PAS TAG to the address tag in the cache, preventing accesses made to the same PA using the wrong PAS TAG from hitting in the cache and therefore improving side-channel resistance. The PAS TAG can also be used as context selector for a Protection Engine attached to the memory controller that encrypts data before it is written to external DRAM.

The Point of Physical Aliasing (PoPA) is a location in the system where the PAS TAG is stripped and the address changes back from a Logical Physical Address to a System Physical Address. The PoPA can be located below the caches, at the completer-side of the system where access to the physical DRAM is made (using encryption context resolved through the PAS TAG). Alternatively, it may be located above the caches to simplify system implementation at the cost of reduced security.

At any point in time, a world can request to transition a page from one PAS to another. The request is made to the monitor code 29 at EL3 which inspects the current state of the GPI. EL3 may only allow a specific set of transitions to occur (e.g. from Non-secure PAS to Secure PAS but not from Realm PAS to Secure PAS). To provide a clean transition, a new instruction is supported by the System—"Data Clean and Invalidate to the Point of Physical Aliasing" which EL3 can submit before transitioning a page to the new PAS—this guarantees that any residual state associated with the previous PAS is flushed from any caches upstream of (closer to the requester-side than) the PoPA 60.

Another property that can be achieved by attaching the GMPU 20 to the master side is efficient sharing of memory between worlds. It may be desirable to grant a subset of N worlds with shared access to a physical granule while preventing other worlds from accessing it. This can be achieved by adding a "restrictive shared" semantic to the Granule Protection Information, while forcing it to use a specific PAS TAG. As an example, the GPI can indicate that a physical Granule is can accessed only by "Realm World" 88 and "Secure World" 84 while being tagged with the PAS TAG of the Secure PAS 84.

An example of the above property is making fast changes in the visibility properties of a specific physical granule. Consider a case where each world is assigned with a private PAS that is only accessible to that World. For specific granules, the World can request to make them visible to the Non-Secure world at any point in time by changing their GPI from "exclusive" to "restrictive shared with Non-Secure world", and without changing the PAS association. This way, the visibility of that granule can be increased without requiring costly cache-maintenance or data copy operations.

Figure 4:
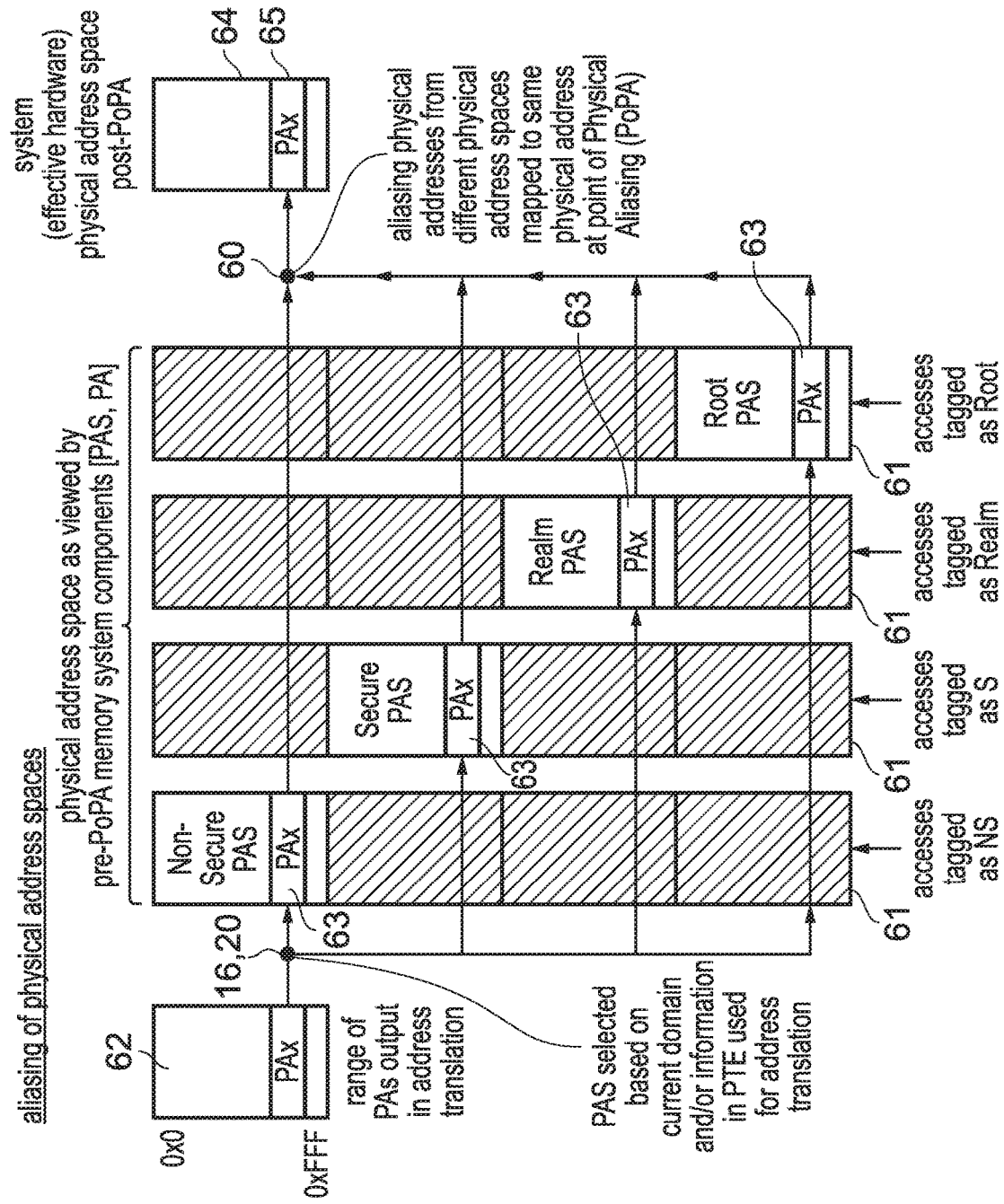
FIG. 4 schematically illustrates aliasing of a number of physical address spaces onto a system physical address space identifying locations in the memory system.

FIG. 4 illustrates the concept of aliasing of the respective physical address spaces onto physical memory provided in hardware. As described earlier, each of the domains 82, 84, 86, 88 has its own respective physical address space 61.

At the point when a physical address is generated by address translation circuitry 16, the physical address has a value within a certain numeric range 62 supported by the system, which is the same regardless of which physical address space is selected. However, in addition to the generation of the physical address, the address translation circuitry 16 may also select a particular physical address space (PAS) based on the current domain 14 and/or information in the page table entry used to derive the physical address. Alternatively, instead of the address translation circuitry 16 performing the selection of the PAS, the address translation circuitry (e.g. MMU) could output the physical address and the information derived from the page table entry (PTE) which is used for selection of the PAS, and then this information could be used by the PAS filter or GMPU 20 to select the PAS.

The selection of PAS for a given memory access request may be restricted depending on the current domain in which the processing circuitry 10 is operating when issuing the memory access request, according to rules defined in the following table:

| Current Domain | Non-Secure PAS | Secure PAS | Realm PAS | Root PAS |
| --- | --- | --- | --- | --- |
| Non-secure | Accessible | Inaccessible | Inaccessible | Inaccessible |
| Secure | Accessible | Accessible | Inaccessible | Inaccessible |
| Realm | Accessible | Inaccessible | Accessible | Inaccessible |
| Root | Accessible | Accessible | Accessible | Accessible |

For those domains for which there are multiple physical address spaces available for selection, the information from the accessed page table entry used to provide the physical address is used to select between the available PAS options.

Hence, at the point when the PAS filter 20 outputs a memory access request to the system fabric 24, 8 (assuming it passed any filtering checks), the memory access request is associated with a physical address (PA) and a selected physical address space (PAS).

From the point of view of memory system components (such as caches, interconnects, snoop filters etc.) which operate before the point of physical aliasing (PoPA) 60, the respective physical address spaces 61 are viewed as entirely separate ranges of addresses which correspond to different system locations within memory. This means that, from the point of view of the pre-PoPA memory system components, the range of addresses identified by the memory access request is actually four times the size of the range 62 which could be output in the address translation, as effectively the PAS identifier is treated as additional address bits alongside the physical address itself, so that depending on which PAS is selected the same physical address PAx can be mapped to a number of aliasing physical addresses 63 in the distinct physical address spaces 61. These aliasing physical addresses 63, all actually correspond to the same memory system location implemented in physical hardware, but the pre-PoPA memory system components treat aliasing addresses 63 as separate addresses. Hence, if there are any pre-PoPA caches or snoop filters allocating entries for such addresses, the aliasing addresses 63 would be mapped into different entries with separate cache hit/miss decisions and separate coherency management. This reduces likelihood or effectiveness of attackers using cache or coherency side channels as a mechanism to probe the operation of other domains.

The system may include more than one PoPA 60. At each PoPA 60, the aliasing physical addresses are collapsed into a single de-aliased address 65 in the system physical address space 64. The de-aliased address 65 is provided downstream to any post-PoPA components, so that the system physical address space 64 which actually identifies memory system locations is once more of the same size as the range of physical addresses that could be output in the address translation performed on the requester side. For example, at the PoPA 60 the PAS identifier may be stripped out from the addresses, and for the downstream components the addresses may simply be identified using the physical address value, without specifying the PAS. Alternatively, for some cases where some completer-side filtering of memory access request is desired, the PAS identifier could still be provided downstream of the PoPA 60, but may not be interpreted as part of the address so that the same physical addresses appearing in different physical address spaces 60 would be interpreted downstream of the PoPA as referring to the same memory system location, but the supplied PAS identifier can still be used for performing any completer-side security checks.

Figure 5:
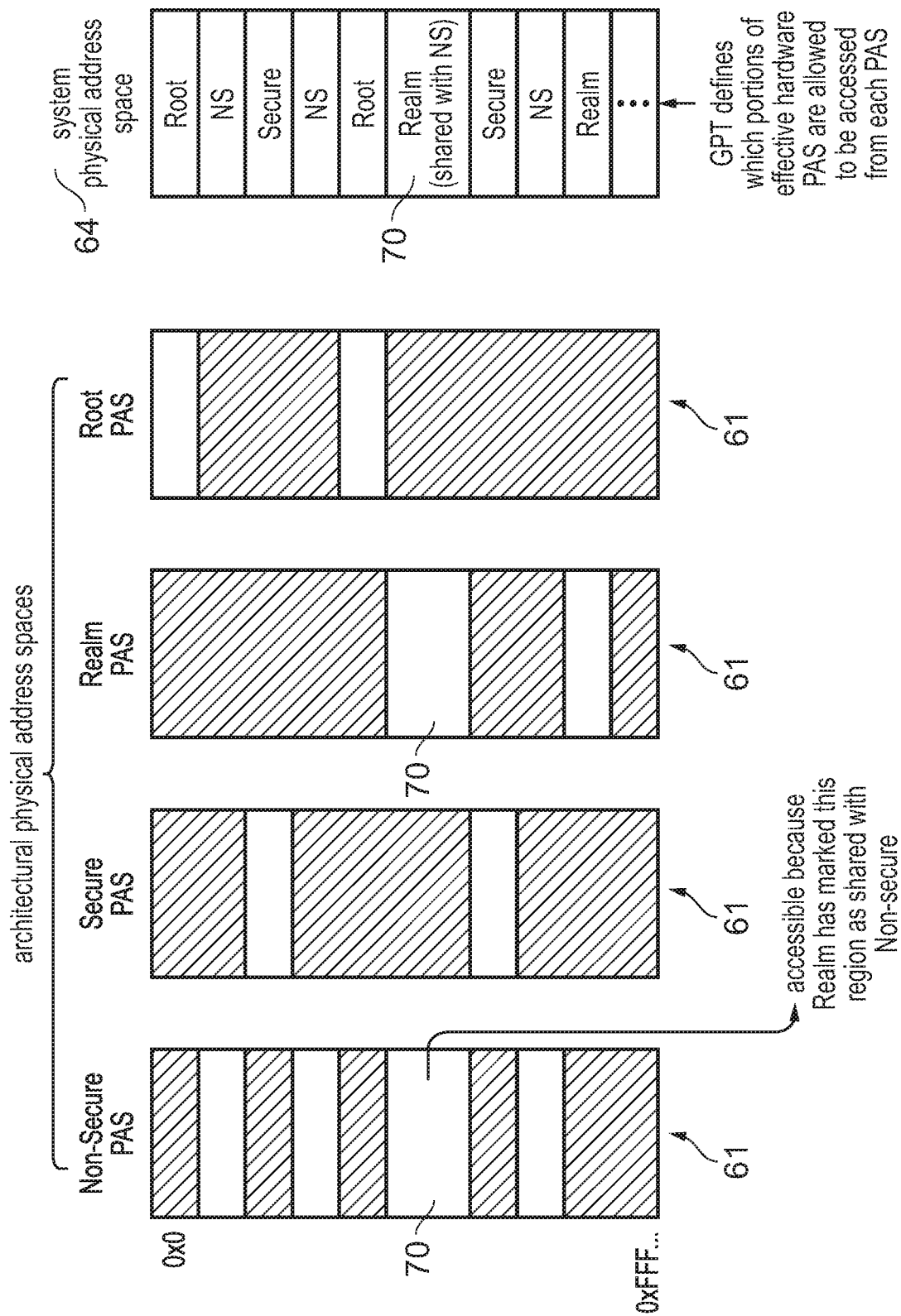
FIG. 5 illustrates an example of partitioning the effective hardware physical address space so that different architectural physical address spaces have access to respective portions of the system physical address space.

FIG. 5 illustrates how the system physical address space 64 can be divided, using the granule protection table 56, into chunks allocated for access within a particular architectural physical address space 61. The granule protection table (GPT) 56 defines which portions of the system physical address space 65 are allowed to be accessed from each architectural physical address space 61. For example the GPT 56 may comprise a number of entries each corresponding to a granule of physical addresses of a certain size (e.g. a 4K page) and may define an assigned PAS for that granule, which may be selected from among the non-secure, secure, realm and root domains. By design, if a particular granule or set of granules is assigned to the PAS associated with one of the domains, then it can only be accessed within the PAS associated with that domain and cannot be accessed within the PASs of the other domains. However, note that while a granule allocated to the secure PAS (for instance) cannot be accessed from within the root PAS, the root domain 82 is nevertheless able to access that granule of physical addresses by specifying in its page tables the PAS selection information for ensuring that virtual addresses associated with pages which map to that region of physical addressed memory are translated into a physical address in the secure PAS instead of the root PAS. Hence, the sharing of data across domains (to the extent permitted by the accessibility/inaccessibility rules defined in the table described earlier) may be controlled at the point of selecting the PAS for a given memory access request.

However, in some implementations, in addition to allowing a granule of physical addresses to be accessed within the assigned PAS defined by the GPT, the GPT could use other GPT attributes to mark certain regions of the address space as shared with another address space (e.g. an address space associated with a domain of lower or orthogonal privilege which would not normally be allowed to select the assigned PAS for that domain's access requests). This can facilitate temporary sharing of data without needing to change the assigned PAS for a given granule. For example, in FIG. 5 the region 70 of the realm PAS is defined in the GPT as being assigned to the realm domain, so normally it would be inaccessible from the non-secure domain 86 because the non-secure domain 86 cannot select the realm PAS for its access requests. As the non-secure domain 26 cannot access the realm PAS, then normally non-secure code could not see the data in region 70.

However, if the realm temporarily wishes to share some of its data in its assigned regions of memory with the non-secure domain then it could request that the monitor code 29 operating in the root domain 82 updates the GPT 56 to indicate that region 70 is to be shared with the non-secure domain 86, and this may make region 70 also be accessible from the non-secure PAS as shown on the left hand side of FIG. 5, without needing to change which domain is the assigned domain for region 70. If the realm domain has designated a region of its address space as shared with the non-secure domain, then although the memory access requests targeting that region which are issued from the non-secure domain may initially specify the non-secure PAS, the PAS filter 20 may remap the PAS identifier of the request to specify the realm PAS instead, so that downstream memory system components treat the request as if it was issued from the realm domain all along. This sharing can improve performance because the operations for assigning a different domain to a particular memory region may be more performance intensive involving a greater degree of cache/TLB invalidation and/or data zeroing in memory or copying of data between memory regions, which may be unjustified if the sharing is only expected to be temporary.

Figure 6:
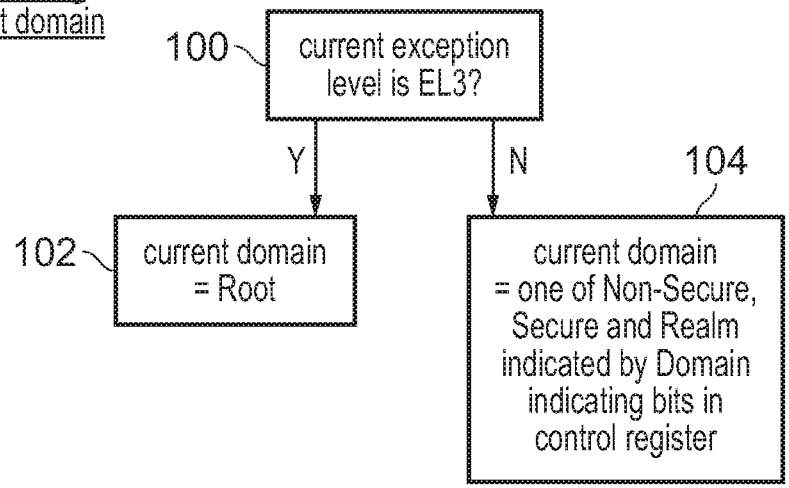
FIG. 6 is a flow diagram illustrating a method of determining the current domain of operation of the processing circuitry.

FIG. 6 is a flow diagram showing how to determine the current domain of operation, which could be performed by the processing circuitry 10 or by address translation circuitry 16 or the PAS filter 20. At step 100 it is determined whether the current exception level 15 is EL3 and if so then at step 102 the current domain is determined to be the root domain 82. If the current exception level is not EL3, then at step 104 the current domain is determined to be one of the non-secure, secure and realm domains 86, 84, 88 as indicated by at least two domain indicating bits 14 within an EL3 control register of the processor (as the root domain is indicated by the current exception level being EL3, it may not be essential to have an encoding of the domain indicating bits 14 corresponding to the root domain, so at least one encoding of the domain indicating bits could be reserved for other purposes). The EL3 control register is writable when operating at EL3 and cannot be written from other exception levels EL2-EL0.

Figure 7:
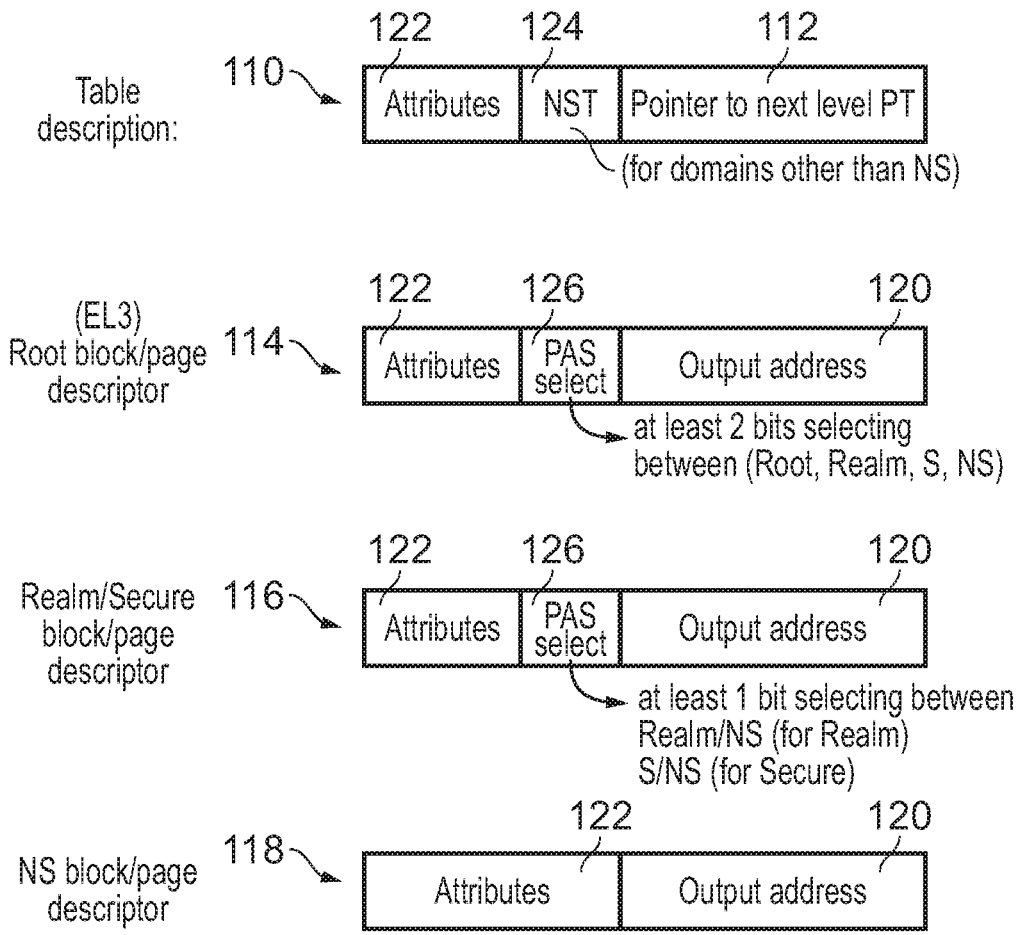
FIG. 7 shows examples of page table entry formats for page table entries used for translating virtual addresses to physical addresses.

FIG. 7 shows an example of page table entry (PTE) formats which can be used for page table entries in the page table structures used by the address translation circuitry 16 for mapping virtual addresses to physical addresses, mapping virtual addresses to intermediate addresses or mapping intermediate addresses to physical addresses (depending on whether translation is being performed in an operating state where a stage 2 translation is required at all, and if stage 2 translation is required, whether the translation is a stage 1 translation or a stage 2 translation). In general, a given page table structure may be defined as a multi-level table structure which is implemented as a tree of page tables where a first level of the page table is identified based on a base address stored in a translation table base address register of the processor, and an index selecting a particular level 1 page table entry within the page table is derived from a subset of bits of the input address for which the translation lookup is being performed (the input address could be a virtual address for stage 1 translations of an intermediate address for stage 2 translations). The level 1 page table entry may be a "table descriptor" 110 which provides a pointer 112 to a next level page table, from which a further page table entry can then be selected based on a further subset of bits of the input address. Eventually, after one or more lookups to successive levels of page tables, a block or page descriptor PTE 114, 116, 118 may be identified which provides an output address 120 corresponding to the input address. The output address could be an intermediate address (for stage 1 translations performed in an operating state where further stage 2 translation is also performed) or a physical address (for stage 2 translations, or stage 1 translations when stage 2 is not needed).

To support the distinct physical address spaces described above, the page table entry formats may, in addition to the next level page table pointer 112 or output address 120, and any attributes 122 for controlling access to the corresponding block of memory, also specify some additional state for use in physical address space selection.

For a table descriptor 110, the PTEs used by any domain other than the non-secure domain 86 includes a non-secure table indicator 124 which indicates whether the next level page table is to be accessed from the non-secure physical address space or from the current domain's physical address space. This helps to facilitate more efficient management of page tables. Often the page table structures used by the root, realm or secure domains 24 may only need to define special page table entries for a portion of the virtual address space, and for other portions the same page table entries as used by the non-secure domain 26 could be used, so by providing the non-secure table indicator 124 this can allow higher levels of the page table structure to provide dedicated realm/secure table descriptors, while at a certain point of the page table tree, the root realm or secure domains could switch to using page table entries from the non-secure domain for those portions of the address space where higher security is not needed. Other page table descriptors in other parts of the tree of page tables could still be fetched from the relevant physical address space associated with the root, realm or the secure domain.

Figure 8:
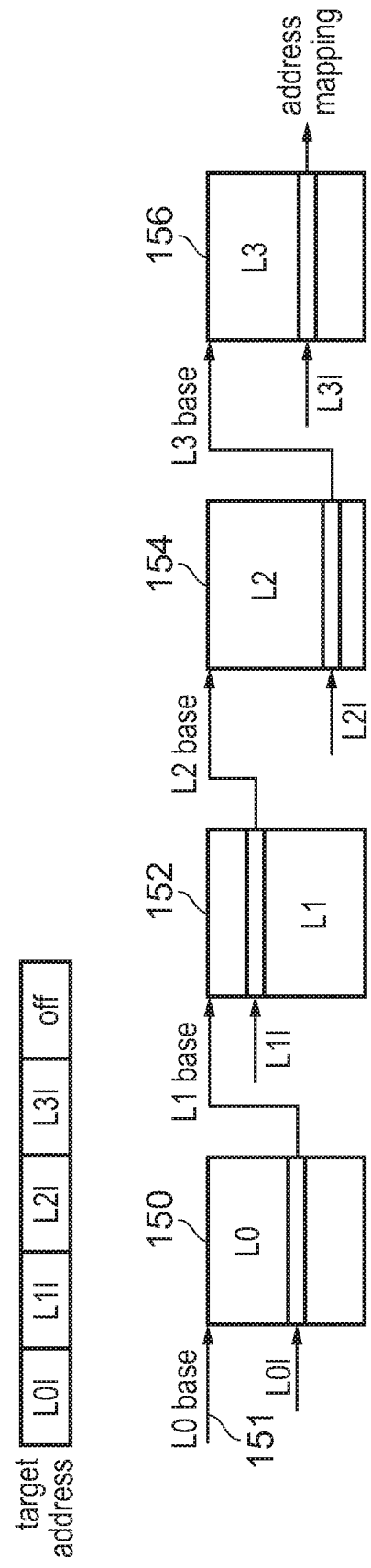
FIG. 8 illustrates an example of a multi-level page table structure with fixed nesting of page tables.

On the other hand, the block/page descriptors 114, 116, 118 may, depending on which domain they are associated with, include physical address space selection information 126. The non-secure block/page descriptors 118 used in the non-secure domain 86 do not include any PAS selection information because the non-secure domain is only able to access the non-secure PAS. However for the other domains the block/page descriptor 114, 116 includes PAS selection information 126 which is used to select which PAS to translate the input address into. For the root domain 22, EL3 page table entries may have PAS selection information 126 which includes at least 2 bits to indicate the PAS associated with any of the 4 domains 82, 84, 86, 88 as the selected PAS into which the corresponding physical address is to be translated. In contrast, for the realm and secure domains, the corresponding block/page descriptor 116 need only include one bit of PAS selection information 126 which, for the realm domain, selects between the realm and non-secure PASs, and for the secure domain selects between the secure and non-secure PASs. To improve efficiency of circuit implementation and avoid increasing the size of page table entries, for the realm and secure domains the block/page descriptor 116 may encode the PAS selection information 126 at the same position within the PTE, regardless of whether the current domain is realm or secure, so that the PAS selection bit 126 can be shared. As shown in FIG. 8, a page table structure may be implemented using multiple levels of page tables 150, 152, 154, 156, which may be traversed in a page table walk operation to identify the address mapping for a particular target address. As shown in FIG. 8, a given set of index bits L0I may be used to index into a level zero page table 150 whose location in memory is identified by a level zero (L0) base address 151. The indexed entry of the L0 table 150 identifies a pointer providing an L1 base address identifying the location in memory of an L1 page table 152. A different subset of index bits L1I from the target address selects one of the entries of the L1 page table 152, which then identifies an L2 base address identifying the memory location of a L2 page table 154. Another subset of index bits L2I from the target address indexes into the L2 page table 154, to identify an L3 base address which identifies the location of an L3 page table 156. Yet another subset of bits L3I of the target address then selects a particular entry of the L3 page table 156 which provides the actual address mapping for mapping the target address into a translated address such as a physical address (as well as providing any associated access permission and/or PAS selection information). Hence, the L3 page table 156 is the final page table providing leaf page table entries which provide the actual address mapping information and the higher level page tables 150, 152, 154 provide intermediate entries which identify the base address of a next level page table.

It will be appreciated that providing four levels of page table is just one example and others could use different numbers of levels of page tables. Also, it is possible that, if a larger block of address space is to share the same translation mapping and other information, then one of the entries in the higher-level page tables 150, 152, 154 could specify that it is a leaf entry providing the address mapping directly, so that no further stepping through subsequent levels is required (while other entries within the same higher-level page table 150, 152, 154 could still act as branch entries which contain the base address pointing to a subsequent-level page table).

By splitting page tables into different levels in this way, the total amount of memory storage required for storing the entire page table structure can be reduced because it is not necessary to locate the address mappings for translating a given amount of address space in a region of memory having a size proportional to the address size being mapped, exploiting the fact that often large chunks of the address space do not have any mappings defined yet by the operating system or other process setting the address translation data. While FIG. 8 shows an example where the index bits L0I, L1I etc. are used directly as the index for selecting a corresponding page table entry, the index could also be the result of a hash function applied to the index bits.

In some systems, the TLB 18 could include separate cache structures for caching translation entries from different levels of the page table. For example, the TLB 18 could include a main TLB structure for caching leaf entries from the final level page table 156, as well as a walk cache structure for caching higher level page table entries from page tables 150, 152, 154. On the other hand, other embodiments may provide a TLB which uses a shared cache structure to cache address translation data from multiple levels of the page table. Other embodiments may only cache the leaf entries which can be looked up to provide the address mapping corresponding to a given VA, but may not carry branch entries from higher-level page tables 150, 152, 154. Any of these approaches can be used. While FIG. 1 shows a single TLB 18, some implementations may include multiple levels of TLB cache structures in a cache hierarchy, to trade off capacity against access latency (e.g. a smaller numbers of entries stored in a level 0 TLB for fast access, and a larger number of entries stored in a level 1 TLB for slower access in the event of a miss in the level 0 TLB).

For some operating states of the processor 10, the address translation process may also involve multiple stages of address translation (whether one stage or two stages of address translation are required may depend in the current exception level 15 and/or configuration information set in registers 12). For example, the VAs used to identify memory locations by the instructions executed by an application or operating system running on a CPU 4 may be translated into intermediate physical addresses (IPAs) in a stage 1 translation. A stage 1 address translation structure for controlling the stage 1 address translation may be set by the operating system or another process operating at EL1 for example. From the operating system's point of view the IPAs generated in the stage 1 address translation may be assumed to be the physical addresses of the actual memory locations being accessed. However, to support virtualisation and prevent identical IPAs used by different operating systems coexisting on the same device from conflicting, a hypervisor or other process operating at EL2 may then provide a further second stage address translation between the IPAs and the PAs to be provided to the memory system. As described above with reference to FIGS. 4 and 5, these PAs may be PAs within a selected physical address space, and some pre-PoPA memory system components may treat identical PA values in different physical address spaces as if they refer to different physical locations. Hence there may be a second stage translation table structure defined by code operating at EL2, to control the stage 2 address translation.

Note that each of the two stages of address translation may use multiple levels of page tables as shown in FIG. 8. Hence, a full page table walk to identify an address mapping for a given block of addresses identified by a target VA may require each of the base addresses for the page tables used in the stage 1 address translation to go through the stage 2 address translation before accessing the corresponding level of the stage 1 page table. That is, for an example where both stage 1 and stage 2 tables include 4 levels of page tables as shown in FIG. 8, the full page table walk process may include accessing the multiple levels of page tables in the following sequence:

Stage 2 translation of the base address 121 of the stage 1 level 0 page table into a PA (the stage 1 level 0 base address may be an IPA address because the stage 1 translation structures are configured by code operating at EL1). The stage 2 translation comprises 4 lookups (stage 2, level 0; stage 2, level 1; stage 2, level 2; stage 2, level 3).

Stage 1 level 0 lookup based on the level 0 index portion L0I of the target VA to identify the stage 1 level 1 base address (an IPA)

Stage 2 translation of the stage 1 level 1 base address into a PA (again, comprising 4 lookups).

Stage 1 level 1 lookup based on the level 1 index portion L1I of the target VA to identify the stage 1 level 2 base address (an IPA)

Stage 2 translation of the stage 1 level 2 base address into a PA (again comprising 4 lookups)

Stage 1 level 2 lookup based on the level 2 index portion L2I of the target VA to identify the stage 1 level 3 base address (an IPA) Stage 2 translation of the stage 1 level 3 base address into a PA (again comprising 4 lookups).

Stage 1 level 3 lookup based on the level 3 index portion L3I of the target virtual address to identify the target IPA corresponding to the target VA.

Stage 2 translation (again, comprising 4 lookups) of the target IPA into the target PA which can be returned as the translated address corresponding to the original target VA.

Hence, without any caching, the translation would comprise 24 lookups in total. As can be seen from the above sequence, performing the entire page table walk process can be very slow as it may require a large number of accesses to memory to step through each of the levels of page tables for each of the stages of address translation. This is why it is often desirable to cache not only the final level address mapping but also information from entries from higher level page tables of the stage 1 and the stage 2 tables within the TLB 18. This can allow at least some steps of the full page table walk to be bypassed even if the final level address mapping for a given target address is not currently in the address translation cache.

In systems supporting two stages of address translation, some TLBs 18 may be implemented as split TLBs where separate cache structures are provided for caching information from stage 1 and stage 2 page table structures respectively. In this case, two separate TLB lookups may be required for processing a translation request specifying a VA, one lookup in the stage 1 TLB to identify the corresponding IPA and one lookup in the stage 2 TLB to identify the PA corresponding to that IPA. Alternatively, a combined stage 1&2 TLB 18 may be provided where, although the page table walk operation for an address request subject to two stages of address translation requires separate lookups of stage 1 and stage 2 page table structures to identify first a mapping of the VA to an IPA and then to identify a mapping of the IPA to the PA, once this has been done the combined stage 1&2 TLB can be allocated with an entry mapping the VA to the PA directly so that on future accesses to the same VA the PA can be read out from the TLB 18 without needing to perform two separate lookups.

In a typical page table structure with multiple levels such as shown in FIG. 8, the maximum number of levels of the structure is fixed (e.g. 4 levels in the example of FIG. 8). Also, the table size of a table at a given level of the table structure, the size of the region of the address space to which an individual table entry at a given level is applicable, and positions/sizes of the offset bits are typically either fixed and not variable at all, or variable based on global parameters set for the table structure as a whole.

For example, a 4-level page table structure could be implemented with variable granule size selectable from among a number of options (e.g. 4, 16 or 64 kB), and in this case the size per entry, offset bits position/size and table size may be as follows for one example implementation: (note that:

"size per entry" indicates the size of the address range to which the information in a given page table entry at a given level is applicable (rather than the size of the table data for that entry itself;

"granule size" refers to the size per entry for a block-descriptor entry at level 3;

"offset bits" refer to the bits extracted from an input address (VA for stage 1, IPA for stage 2) to select a particular entry from the table at a given level of the table structure; and "table size" refers to the minimum table size allocatable for the table, which corresponds to a size corresponding to the product of the size of the table data for one table entry and $2^X$ where X is the number of offset bits used for indexing into that level of table. This particular example assumes table entries with 64 bits of table data per entry, i.e. 8 bytes, but other examples could use different entry sizes.

| Table level | 4 kB granule size | | | 16 kB granule size | | | 64 kB granule size | | |
|---|---|---|---|---|---|---|---|---|---|
| | Size per entry | Offset bits | Table size | Size per entry | Offset bits | Table size | Size per entry | Offset bits | Table size |
| 0 | 512 GB | 47:39 | 4 kB | 128 TB | 47 | 16 B | — | — | — |
| 1 | 1 GB | 38:30 | 4 kB | 64 GB | 46:36 | 16 kB | 4 TB | 51:42 | 64 kB |
| 2 | 2 MB | 29:21 | 4 kB | 32 MB | 35:25 | 16 kB | 512 MB | 41:29 | 64 kB |
| 3 | 4 kB | 20:12 | 4 kB | 16 kB | 24:14 | 16 kB | 64 kB | 28:16 | 64 kB |

In this particular example, there are restrictions on using 52-bit addresses, and when the selected granule size is 4 kB or 16 kB, the maximum virtual address region size is 48 bits. Similarly, output addresses are limited to 48 bits. 52-bit addresses may be used only when 64 kB granule sizes are used, in this example. Of course, other examples could define other sizes of addresses.

It will be appreciated that the table above shows offset portions used for respective levels for one particular example, and the specific offset portion sizes/positions are not essential. However, it serves to illustrate that in typical page tables, the positions/sizes at which the offset portions for a given table level are extracted are the same for all tables at that level within the entire table structure (they do not vary between different tables at the same level), and are either fixed for that level (if only a fixed granule size is supported), or are variable based on a global parameter defined for the table structure as whole.

Note also that, if a block-descriptor entry is defined at a level other than level 3, then it defines access control information applicable to a region of the size indicated by "size per entry" for that level, e.g. with a 4 kB granule size any entry at level 1 (table-descriptor or block-descriptor) would be applicable to a region 1 GB in size, so the block-descriptor can only be defined at level 1 if all addresses in a contiguous 1 GB region are to share the same access control attributes (address mapping, any associated with permissions indicated in the page table, and PAS selection information). If 4 kB regions with different access control attributes are to be defined, the block-descriptor entry would need to be provided at level 3 and the full 4 levels of traversal of the page table structure would be needed.

Figure 9:
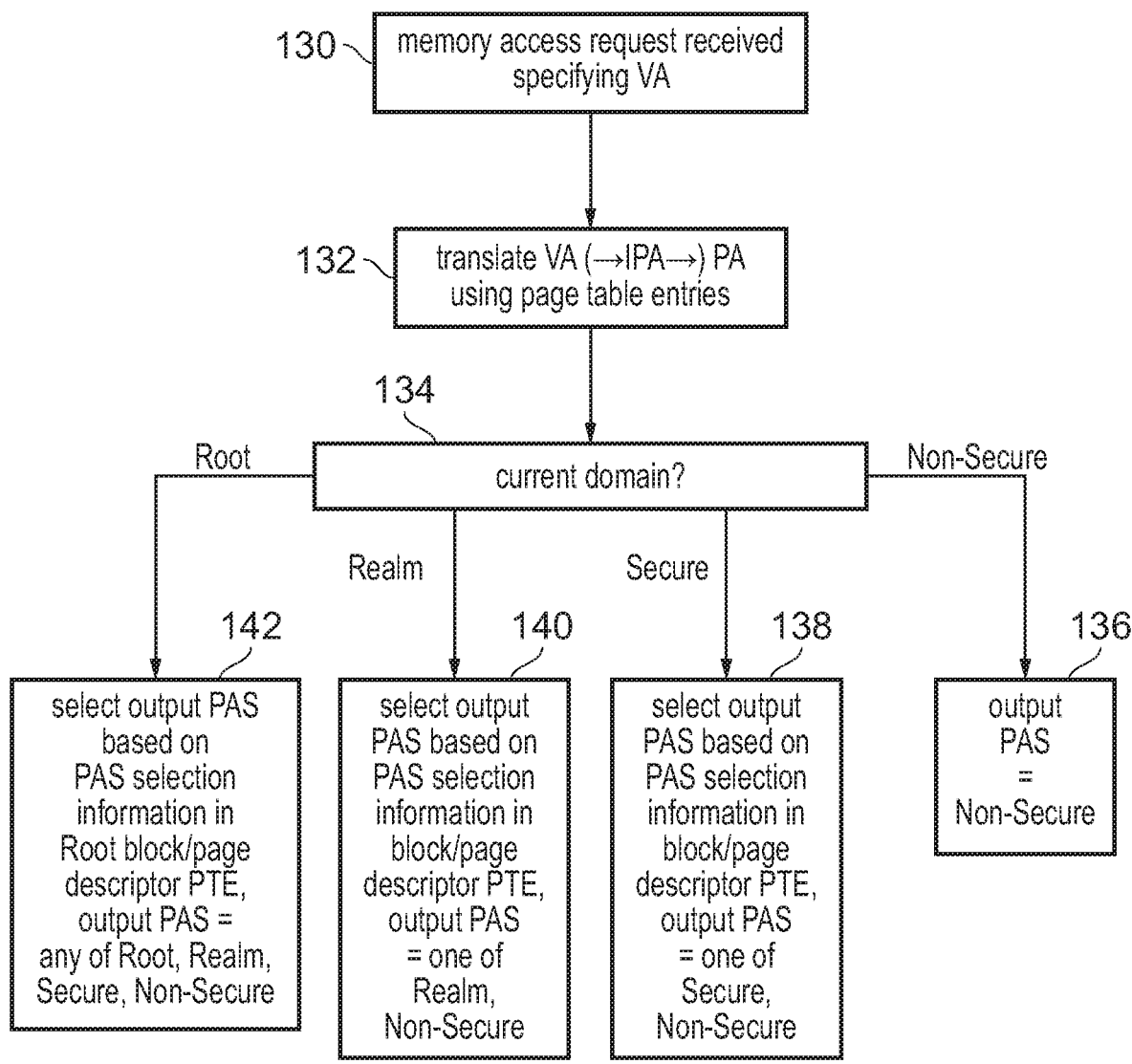
FIG. 9 is a flow diagram showing a method of selecting a physical address space to be accessed by a given memory access request.

FIG. 9 is a flow diagram showing a method of selecting the PAS based on the current domain and the information 124, 126 from the block/page PTE used in generating the physical address for a given memory access request. The PAS selection could be performed by the address translation circuitry 16, or if the address translation circuitry forwards the PAS selection information 126 to the PAS filter 20, performed by a combination of address translation circuitry 16 and the PAS filter 20.

At step 130 in FIG. 8, the processing circuitry 10 issues a memory access request specifying a given virtual address (VA) as a target VA. At step 132 the address translation circuitry 16 looks up any page table entries (or cached information derived from such page table entries) in its TLB 18. If any required page table information is not available, address translation circuitry 16 initiates a page table walk to memory to fetch the required PTEs (potentially requiring a series of memory accesses to step through respective levels of the page table structure and/or multiple stages of address translation for obtaining mappings from a VA to an intermediate address (IPA) and then from an IPA to a PA). Note that any memory access requests issued by the address translation circuitry 16 in the page table walk operations may themselves be subject to address translation and PAS filtering, so the request received at step 130 could be a memory access request issued to request a page table entry from memory. Once the relevant page table information has been identified, the virtual address is translated into a physical address (possibly in two stages via an IPA). At step 134 the address translation circuitry 16 or the PAS filter 20 determines which domain is the current domain, using the approach shown in FIG. 6.

If the current domain is the non-secure domain then at step 136 the output PAS selected for this memory access request is the non-secure PAS.

If the current domain is the secure domain, then at step 138 the output PAS is selected based on the PAS selection information 126 which was included in the block/page descriptor PTE which provided the physical address, where the output PAS will be selected as either secure PAS or non-secure PAS.

If the current domain is the realm domain, then at step 140 the output PAS is selected based on the PAS selection information 126 included in the block/page descripto. PTE from which the physical address was derived, and in this case the output PAS is selected as either the realm PAS or the non-secure PAS.

If at step 134 the current domain is determined to be the root domain, then at step 142 the output PAS is selected based on the PAS selection information 126 in the root block/page descriptor PTE 114 from which the physical address was derived. In this case the output PAS is selected as any of the physical address spaces associated with the root, realm, secure and non-secure domains.

Figure 10:
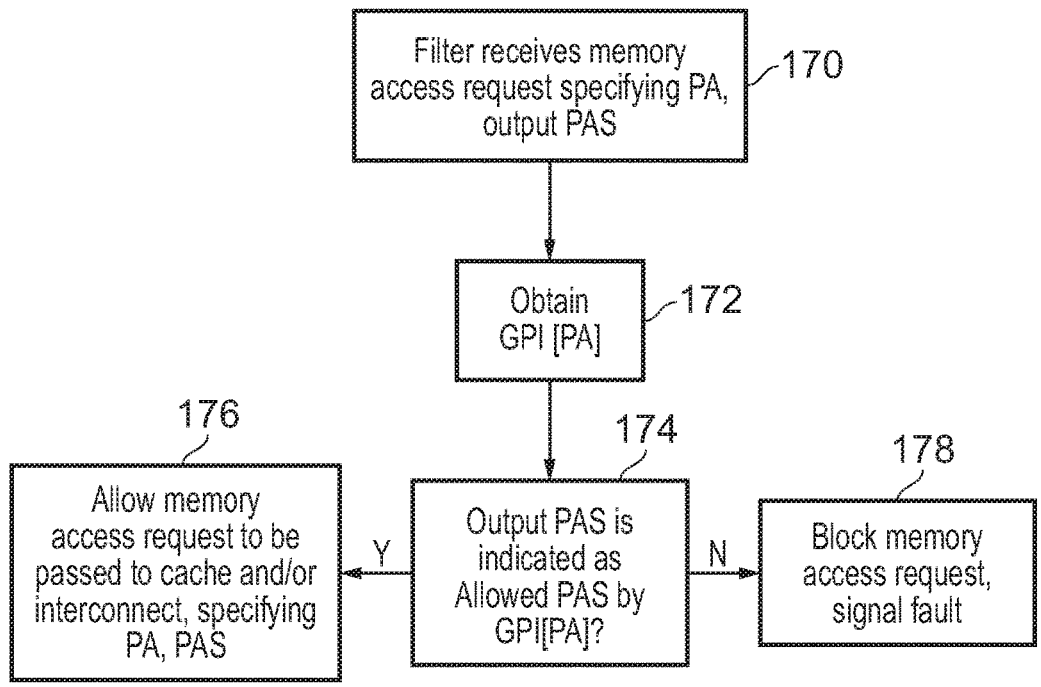
FIG. 10 is a flow diagram showing a method of filtering memory access requests based on whether a selected physical address space associated with the request is defined as an allowed physical address space in granule protection information corresponding to a target physical address defined in a granule protection table structure.

FIG. 10 is a flow diagram illustrating filtering of memory access requests by the filtering circuitry 20. At step 170 a memory access request is received from the address translation circuitry 16 (assuming any permission checks performed by the address translation circuitry have already passed). The received memory access request specifies a target PA and is associated with an output PAS (also referred to as the "selected PAS") which was selected as described for FIG. 9. As mentioned above, the output PAS could be indicated by the address translation circuitry 16 providing an explicit identifier indicating the selected PAS, or by the address translation circuitry 16 forwarding the PAS selection information 126 read from the page tables to the filtering circuitry 20, which together with an indication of the current domain of a processing circuitry 10 can be used to determine the output PAS at the filtering circuitry 20.

At step 172 the filtering circuitry 20 obtains the granule protection information (GPI) that corresponds to the target PA. This could be done either by obtaining the GPI from the granule protection information cache 22 if it is already in the cache, or by the GPT walk circuitry 23 obtaining the GPI from memory by performing a granule protection table walk. A method for performing the GPT walk is described further below with respect to FIG. 13.

Once the GPI corresponding to the target PA has been obtained, at step 174 the filtering circuitry 20 determines whether the output PAS is indicated as an allowed PAS by the GPI associated with the target PA. If the output PAS is not indicated as an allowed PAS by the GPI for the target PA, then at step 178 the memory access request is blocked and a fault is signalled. The signalled fault may be associated with a fault type which identifies that the fault is to be handled by program code executed in the root domain at EL3, and may be associated with fault syndrome/status information indicating the cause of the fault, such as identifying the target PA which was being accessed by the memory access request that caused the fault. On the other hand, if the output PAS for the memory access request is indicated by the GPI as an allowed PAS, then at step 176 the memory access request is allowed to be passed to the cache(s) 24 or the interconnect 8, so that the memory access request can be serviced by the underlying memory system. The memory access request is passed to the cache 24 and/or the interconnect 8 along with an indication of the target PA and the PAS associated with the memory access request. Hence, the filtering circuitry 20 can police whether the target PA for the memory access request is allowed to be accessed as part of the physical address space selected for that request, to enforce the physical address space isolation and partitioning as shown above with respect to FIGS. 4 and 5.

The granule protection table accessed by the GPT walk circuitry 23 could use a table structure as shown in FIG. 8 which has multiple levels where each level stores a pointer to the start of a table at the next level, where the full table is traversed by extracting offsets from static locations within the input address where these locations are defined by the granule size and the maximum number of levels of nested tables is fixed. The typical method to manage protection tables is using such a nested structure which is based on a restriction that the largest memory that can be used for holding "branch tables" (table not at the last level) or "leaf tables" (tables at the last level) is of a constant size such as a single page.

However, since the GMPU 20 is managed by the root of trust it can reside in a carveout that has more memory linearity to leverage. We propose a new table format that allows leveraging this property and creating a page table that can combine different number of levels at each "sub-tree" of the page table. Hence, the examples described below provide a method for efficient storage of protection information at physical page granularity. This is achieved through a novel form of an inverted page table. In its basic form, an inverted page table is indexed by the address of a physical page (or "physical granule") and stores information associated with that page. The Granule Protection Table format introduced here has a structure that allows for more trade-off space between the following parameters: the address range covered by the table, the maximum number of lookups required to traverse the table, and the static cost (table size) that has to be paid, by leveraging linear ranges and localized parameters. The observation used is that there are locations with the physical address space that require the fastest access possible while other locations may have looser performance requirements and therefore present an opportunity for saving table area. This is achieved by allowing the offsets to have sizes/positions calculated based on parameters extracted from entries within the table itself.

By applying "Hybrid-Nesting" to the GPT each entry at the first level of the table can span a "subtree" with a different max number of lookups. This is referred to as the Nesting Level (NL):

The size of a table at any level which is not the last level is defined by a set of constants that are specific per {NL,Level}.

The size of a table at the last level of the subtree is calculated based on the remaining range that has to be covered after taking into account all previous levels.

The size/position of the offset used to index into a table at a given level of the table structure depends on NL and the level of that table.

Hence, we present and efficient nested page table format where the size of a table at each level is not necessarily a fixed size (like the common practice in the state of the art) and where the maximum number of levels at each "subtree" within the nested page table is not necessarily a global constant.

The Granule Protection Table describes the permission properties of physical pages within the address space of the system. Since not all address ranges within the system address space contain pages that require protection a basic structure of the table could be a 2-level table where an entry in the first level (L0GPT) either describes the property of a block of memory or includes a pointer to a table at the second level (L1GPT). However, such a structure can be further developed to have "dense subtrees" that are quick to traverse and make use of large linear memory and "sparse subtrees" that take longer to traverse but have modest memory allocation requirements.

Figure 11:
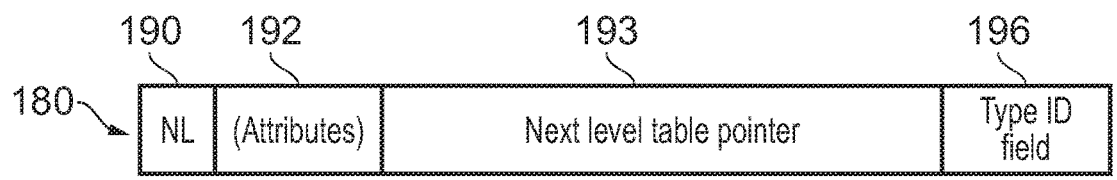
FIG. 11 illustrates an example of table entries of the granule protection table, including a table descriptor entry and a block descriptor entry.
Figure 11:
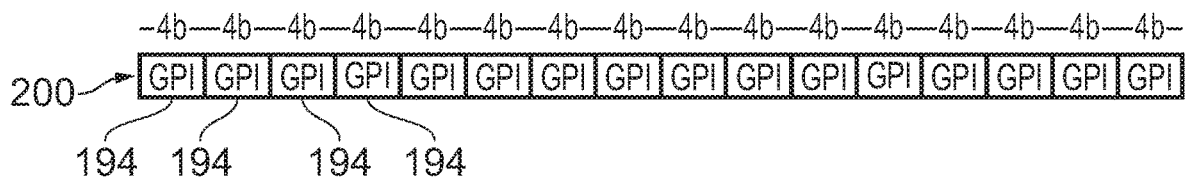

FIG. 11 illustrates an example of a format for a GPT entry. GPT entries may be either table descriptor entries 180 which point to a GPT entry at the next level, or block descriptor entries 200 which provide the granule protection information (GPI) which specifies the protection properties for a corresponding granule or physical addresses. As shown in FIG. 11, the block descriptor GPT entries 200 comprise a number of GPI fields 194, each providing information associated with a corresponding granule of physical addresses. As only a few bits are needed to define the permissions associated with a page, a single block descriptor table entry 200 can include the GPI properties of multiple granules. As an example, a block descriptor entry 200 in the last level of the protection table could be 8 bytes in size and accommodate 16 4-bit fields 194 where each field (Granule Protection Information or GPI) 194 specifies the protection properties of a single physical granule.

For example, a protection property described by the GPI can be:
  The Physical Address Space (PAS) the granule is associated with (identifying that PAS as an allowed PAS and all other PASs as non-allowed PASs).
  An encoding specifying that the granule is not associated with any PAS (and therefore can not be accessed—i.e. none of the PASs are allowed PASs).
  An encoding specifying that the granule can be associated with any PAS, i.e. that all PASs are allowed PASs.
  In examples which support restrictive sharing as described earlier, other encodings could identify that a subset of two or more of the PASs are allowed PASs but at least one other PAS is a non-allowed PAS.

The mapping of which particular encoding of the GPI field 194 identifies each different protection property can be selected arbitrarily for a particular instruction set architecture. E.g. different four bit encodings 0000, 0001, 0010, etc. can be allocated to different properties selected from the list above.

Hence, each GPI field 194 provides information identifying zero, one or more allowed physical address spaces which are associated with a corresponding granule of physical addresses. It is also possible that GPI encodings could be allocated for indicating other information and so it is not essential that each GPI field needs to be four bits as in the particular example of FIG. 11. Not all encodings of the GPI field may be valid. There may also be some invalid encodings which are reserved for future expansion or which remain after encoding all the options for GPI considered necessary. Other invalid encodings may be used to represent other information other than a valid option for the GPI attribute, such as the contiguity indicator 300 described further below.

The table descriptor GPT entry 180 includes a number of pieces of information including a nesting level (NL) parameter 190, a next level table pointer 193 providing an address marking the start of a granule protection table at the next level of the table structure and a type identifier field 196 which distinguishes the table descriptor entry 180 from the block descriptor entry 200. Note that the block descriptor entry 200 need not itself have a type ID field 196, because the type ID field 196 in the table descriptor entry 180 could be chosen to have a value which does not occur for any valid GPI encoding when GPI fields are set to the corresponding portion of the block descriptor entry that is used for encoding the type ID field 196 in the table descriptor entry 180. For instance the type ID field 196 in the table descriptor entry 180 could be recorded at the position of a particular one of the GPT fields 194 in the block descriptor entry and set to one of the invalid encodings for that GPT field 194. This allows more efficient use of the encoding space of the block descriptor entry 200 by avoiding the need for an explicit type ID field.

Optionally, the table descriptor entry 180 may also specify one or more attributes 192 which could provide other information associated with the address region whose attributes are represented by the underlying sub-tree of the table structure. It will be appreciated that although not illustrated in FIG. 11 the respective GPEs 180, 200 could also include information not specified. Also, the particular ordering of the fields 190, 192, 193, 196 shown in FIG. 11 is just one example, and other examples could have the fields in a different order.

The variable nesting level parameter 190, NL, controls a number of aspects associated with the nesting of multiple levels of tables within the GPT table structure. In particular, by varying NL specified in table descriptor entry 180 accessed for a particular address in the starting level granule protection table (e.g. a L0 granule protection table accessed based on a stored GPT base address, analogous to the L0 table 150 accessed based on L0 base address 151 shown in FIG. 8 for the page table walk), the GPT walk circuitry 23 varies the size and position of the respective offset portions of the target physical address which are used to index into respective levels of table within the multi-level GPT structure. The NL parameter 190 also controls the maximum number of levels traversed to reach the block descriptor entry 200 for a given physical address, the table size (memory footprint) associated with a table at a given level of the table structure, and the "size per entry" indicating the size of the address range to which the information in a given table entry at a given entry is applicable.

In this example, the NL field 190 is ignored for any table descriptors accessed at a level of the table structure other than the starting level, so that the NL parameter 190 within the starting level of the table structure controls the way all tables within the corresponding sub-tree under that starting-level table descriptor entry 180 are accessed.

In this example, the following global parameters are specified for the table:

PGS[1:0]—Physical Granule size (e.g. encoded such that PGS=0 indicates granule size of 4 KB, PGS of 1 indicates granule size of 16 KB, PGS=2 indicates granule size of 64 KB)

SL[1:0]—Starting Level (0—Level0, 1—Level1, 2—Level2, 3—Level3). The Starting Level is Level0 for tables that can be as deep as 4 levels, Level 1 for tables that can be as deep as 3 levels and so on.

SLBS [5:0]—Start Level Block Size—Exponent of the block size that is described by an entry of the Starting Level (Block size=2^SLBS).

TSZ[5:0], exponent of the total size of the memory that is described by the table (Total size=2^TSZ)

For each entry at the Starting Level the following parameters are specified:
   Entry type 196 (block/descriptor)
   Nesting Level (NL) 190—The Nesting Level defines the maximal number of levels that the subtree is composed of (1=2 levels, 2=3 levels, etc.). NL defines what bits of the input address will be used as an offset for accessing the table at the next level.

Table sizes are defined as follows:
   The size of a table at the starting level is defined by Total Size and by Block size.
   The size of a table at any other level which is not the last level is a constant that is defined per {NL, Level}, where NL is obtained from the starting-level table entry accessed on the path of traversal through the tree structure to reach the table at that other level.
   The size of a table at the last level of the subtree is calculated based on the remaining range that has to be covered after taking into account all previous levels.

An example for how NL can be used to calculate the offsets that are used for traversing each subtree within a hybrid table is shown below. The example is based on the following principles (clearly these could be varied for other examples):

Table entry size (TES) is 8 Bytes
   Granule Size (GS) is 2^(12+PGS)
   An entry of a table in the last level has 16 GPI fields where each GPI describes the properties of a single granule.
   GPI Size (GPIS) is 4bits.

An entry in the table at Starting Level describes a Block-Size (BS) of size 2^SLBS and so the table itself has a table size of (2^TSZ/BS)*TES.

If StartLevel.NestingLevel indicates a subtree composed of 2 levels then the a table at the second level has a table size of (BS/GS)*GPIS If StartLevel.NestingLevel indicates a subtree composed of 3 levels then
   The table at the second level has a table size of GS
   The table at the third level has a table size of ((BS/(GS/TES))/GS)*GPIS If StartLevel.NestingLevel indicates a subtree composed of 4 levels then
   The table at the second level has a table size of GS
   The table at the third level has a table size of GS
   The table at the fourth level has a table size of ((BS/(GS/TES)/(GS/TES))/GS)*GPIS The offsets can be derived from the NL parameter and global parameters as follows (where SL refers to the Starting level of the table and SL·NL refers to the NL parameter specified by the entry of the Starting level table that was selected based on the Starting level offset portion of the target address):

| Level | Offset | |
|---|---|---|
| SL | PA[TSZ − 1: SLBS] | |
| SL + 1 | If SL.NL = 1:<br>PA[(SLBS − 1):<br>(12 + PGS*2 + 4)] | If SL.NL = 2 or 3:<br>PA[(SLBS − 1):<br>(SLBS − 1 − 8 − 2*PGS)] |
| SL + 2 | If SL.NL = 2:<br>PA[(SLBS − 1 − 8 − 2*PGS) − 1:<br>(12 + PGS*2 + 4)] | If SL.NL = 3:<br>PA[(SLBS − 1 − 8 − 2*PGS) − 1:<br>(SLBS − 1 − 8 − 2*PGS) − 1 − 8 − 2*PGS] |
| SL + 3 | PA[(SLBS − 1 − 8 − 2*PGS) − 1 − 8 − 2*PGS) − 1: 12 + PGS*2 + 4] | |

Note that if SL·NL=1 then there can be no access to tables at level SL+2 or SL+3 as the maximum number of tables is 2 including the starting level. Similarly if SL·NL=2 there can be no access to tables at level SL+3. Hence, a table at level SL+3 can be accessed only if SL·NL=3. Also, for tables at SL+1, the table will have a larger size (and be indexed based on a larger offset portion) when SL·NL=1 than if SL·NL=2 or 3. Similarly, for tables at SL+2 the table will have a larger size (and be indexed based on a larger offset portion) when SL·NL=2 than if SL·NL=3.

Also, note that in this example the lower bit for the final level table is bit **12+PGS*2+4** (rather than 12+PGS*2) because in the example of FIG. 11 16 GPI entries for 16 respective granules of physical addresses are packed into a single block-descriptor entry, so bits 15:12 of the target PA would be used to select which particular GPI of the block-descriptor entry corresponds to the target PA, and so are not needed as offset bits for selecting the table entry.

As a particular example, for PGS=0 (4 kB granules), SL=0, SLBS=39 (starting level block size of 512 GB) and TSZ=48:

| Table level | NL = 1 | | | NL = 2 | | | NL = 3 | | |
| --- | --- | --- | --- | --- | --- | --- | --- | --- | --- |
| | Size per entry | Offset bits | Table size | Size per entry | Offset bits | Table size | Size per entry | Offset bits | Table size |
| 0 | 512 GB | 47:39 | 4 kB | 512 GB | 47:39 | 4 kB | 512 GB | 47:39 | 4 kB |
| 1 | 64 kB (16 GPI fields for 4 kB granules) | 38:16 | 64 MB | 1 GB | 38:30 | 4 kB | 1 GB | 38:30 | 4 kB |
| 2 | — | — | — | 64 kB (16 GPI fields for 4 kB granules) | 29:16 | 128 kB | 2 MB | 29:21 | 4 kB |
| 3 | — | — | — | — | — | — | 64 kB (16 GPI fields for 4 kB granules) | 20:16 | 4 kB |

It will be appreciated that providing flexibility to vary the global parameters PGS, SL, SLBS, TSZ described above is optional and so any of these parameters could be fixed for a given implementation. It is not necessary for the global parameters PGS, SL, SLBS or TSZ to be variable, selectable by software at runtime. Alternatively, other approaches may support variable definitions for these global parameters. Regardless of whether the global parameters are variable or fixed, by defining a variable nesting level NL in an entry at the starting level of the GPT structure, this enables a tradeoff between the performance in locating the GPI for a given target address and the size of the range of addresses in memory which need to be allocated for the table data for protecting that granule of target addresses.

Figure 12:
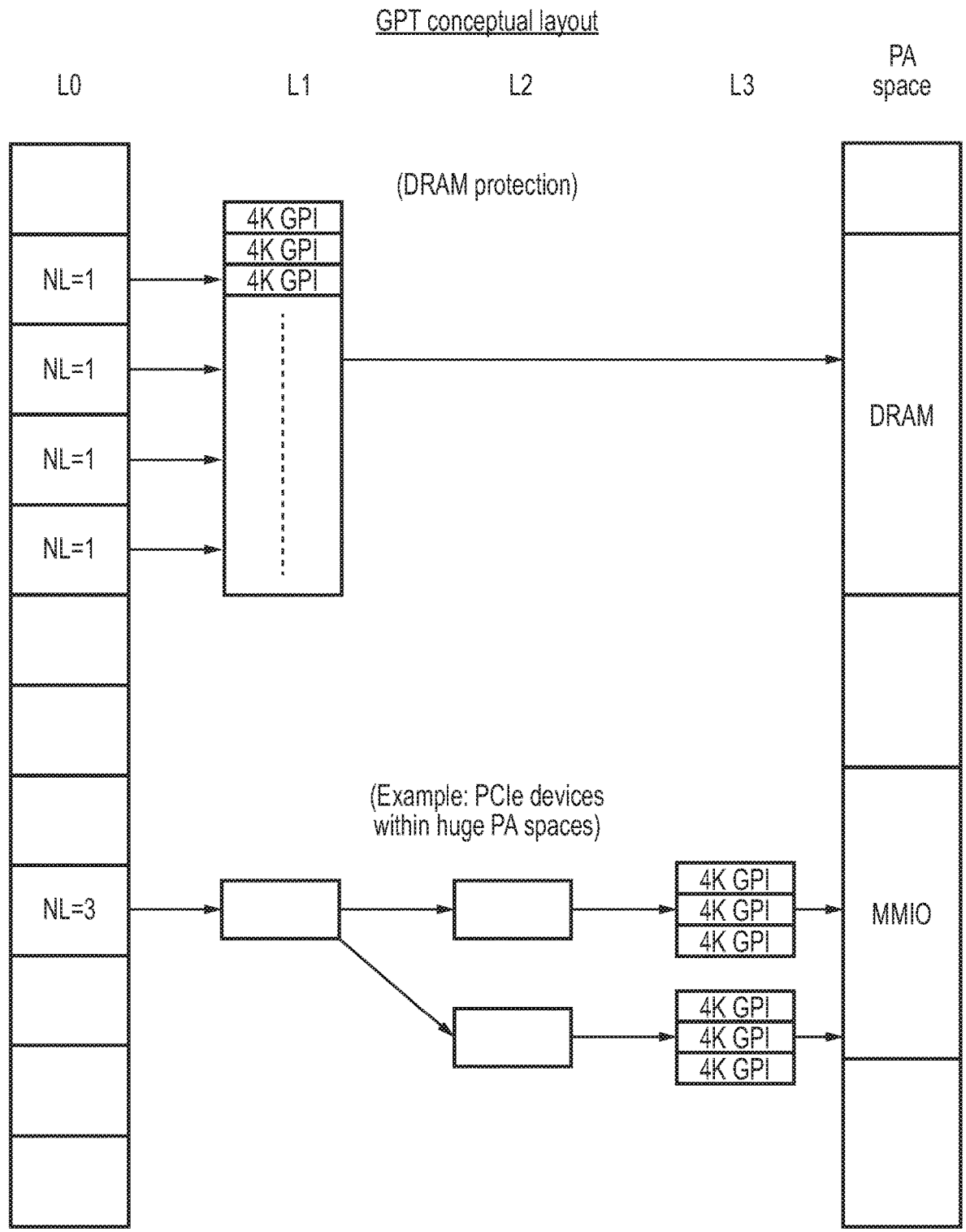
FIG. 12 shows an example of a conceptual layout of the multi-level granule protection cable illustrating an example with variable nesting based on a nesting control parameter defined in a higher-level table entry.

FIG. 12 shows a particular example of a GPT layout with variable nesting controlled by the NL parameter 190 in the L0 table descriptor entries. In this example, for a region of the PA space allocated for dynamic random access memory (DRAM), it is more likely that the region would store performance-critical data which may need to be accessed fast by the processor, and so it may be preferable to reduce the maximum number of levels of the table which need to be accessed to locate the corresponding GPI for a given physical address in that region. Hence, the L0 GPT entries corresponding to physical addresses in the DRAM region are set with NL=1, so that they point to one or more larger L1 tables, which together are of sufficient size to comprise GPI fields at 4 kB granularity spanning the DRAM region. For example, this could be a number of 64 MB tables each comprising $2^{23}$ L1 table entries, each L1 table entry providing 16 GPIs for respective 4 kB granules. Note that the reduced number of table levels (2 instead of the usual 4) comes at the expense of having to allocate a contiguous block of memory of larger size (64 MB rather than 4 kB) for each individual L1 table.

In contrast, for a region of the physical address space mapped to memory mapped input/output (MMIO) devices, there may only be a few 4K granules which need to have mappings defined and performance may not be performance critical for such accesses in these regions. For such a region, allocating a 64 MB L1 table could be considered wasteful of memory space when only a few entries in that table would be expected to contain valid GPI. Therefore, by setting NL=3 in the L0 table descriptor entry corresponding to the addresses in the MMIO region, the sub-tree for the MMIO region can be implemented more efficiently in memory by providing four levels of page tables which each have table of size 4 kB, so that the sub-tree providing the chain of entries at levels 1 to 3 for accessing a particular granule of 4 kB comprises 12 kB of table data instead of 64 MB of data as in the DRAM region. While the more memory efficient sub-tree would be slower to access than the sub-tree for the DRAM region, this is not a problem for the MMIO region where performance may not be critical.

Of course, while FIG. 12 shows one example with DRAM and MMIO regions trading off performance against memory footprint in different sub-trees of the same table structure, users may find many other use cases for exploiting varying levels of nesting within the same table. For example, some level 0 table entries could specify a nesting level of 2 to indicate that the maximum number of levels is 3, although this is not shown in the example of FIG. 12.

Note that even though NL indicates the maximum number of levels of table needed to find the GPI for the corresponding granule of physical addresses, this does not exclude the possibility that a block descriptor entry 200 could still be defined at an earlier level of the table structure so as to define unified attributes for a larger block of memory. Hence the variable parameter NL defines the maximum number of levels of the table to be traversed for the particular sub-tree of the structure under the L0 table descriptor entry 180 specifying the NL parameter 190, but this does not imply that there necessarily needs to be accesses to each of the levels up to that maximum number and it is possible that the walk of the table structure could encounter a block descriptor entry 200 at an earlier level.

Although, in the page table structure of FIG. 8 it is also possible to reduce the number of table levels to reach a block descriptor entry, by defining a block descriptor entry 200 at a level other than the final level of the table so as to reduce the number of steps needed to transverse through the structure to reach the block descriptor entry, this approach is only suitable if there is a region of physical addresses of larger size which all needs to be share the same GPI properties. This is because in a conventional multi-level table structure with fixed size offsets similar to the approach shown in FIG. 8 for the page tables, for the 4 kB granule size example, a given entry at level 1, say, would be indexed using L1I offset bits 38:30 so that each L1 entry is applicable to an address range of size 1 GB, so all addresses sharing the same value for those L1I offset bits 38:30 would need to have the same access control attributes if they are to share a single block descriptor entry defined at level 1.

In contrast, with the approach shown in FIG. 12 when the level 1 table is indexed for the DRAM region of the physical address space, when NL=1 this indexing is based on a larger offset portion which includes bits 38:16 (for the specific example above), covering all the remaining offset bits not already used for indexing the level 0 table. This means that each entry corresponds to an individual address block of a smaller size (64 kB, providing individual GPI fields for 16 4 kB granules), so that although only 2 levels of table are provided, more fine-grained control over protection attributes can be achieved than is possible using a L1 block-descriptor entry indexed with the fixed offset definition discussed above with respect to FIG. 8.

Figure 13:
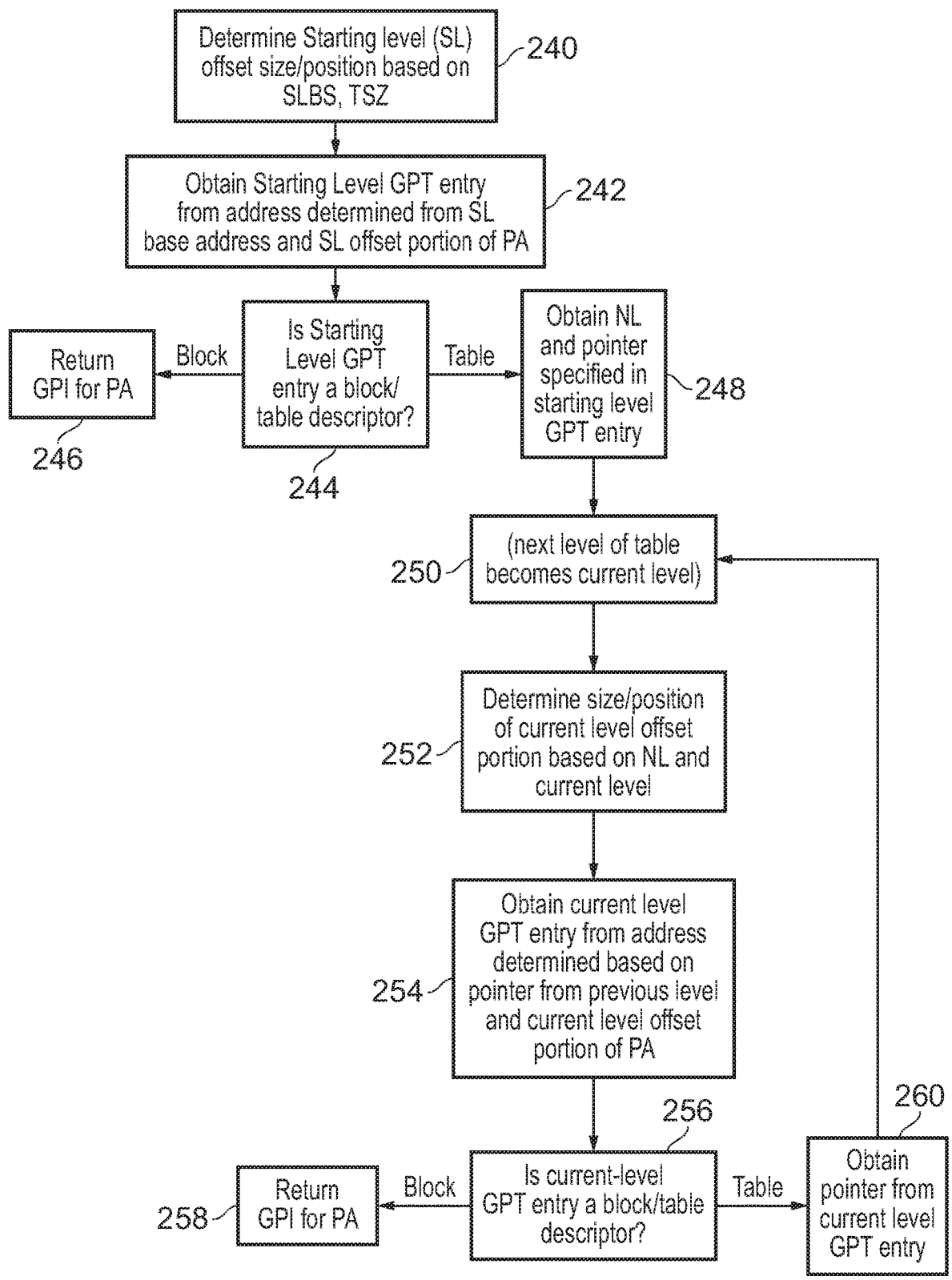
FIG. 13 is a flow diagram showing a method of accessing the granule protection table to obtain access control information for a particular target address, based on the variable nesting control parameter.

FIG. 13 is a flow diagram illustrating a method of performing a GPT walk to obtain GPI for a given target PA from memory. The GPT walk may be performed as part of step 172 of FIG. 10. For implementations having a granule protection information cache 22 (or combined TLB/granule protection information cache 22), the method of FIG. 13 may be performed when a memory access request misses in the granule protection information cache 22. For implementations which do not support caching of granule protection data, the method may be performed for each memory access. The GPT walk method of FIG. 13 is performed by the GPT walk circuitry 23.

At step 240 the size and position of the starting level (SL) offset portion within the target PA is determined based on the starting level block size SLBS and total memory size TSZ described earlier. In implementations where both of the start level block size and total memory size are fixed, then step 240 could be omitted as the starting level offset size and position could be hardwired to a fixed size and position. However, in cases where one or both of SLBS, TSZ is variable then there may be some circuitry to use control parameters defining one or both of SLBS, TSZ to determine the offset for the starting level, according to PA[TSZ-1:SLBS] as shown above.

At step 242 the GPT walk circuitry 23 obtains the starting level GPT entry corresponding to the target PA, by reading an address determined by adding a multiple of the SL offset portion of the PA (having the size and position determined at step 240) to a SL base address stored in a GPT base address register. Once the starting level GPT entry has been returned from memory, at step 244 the GPT walk circuitry 23 determines whether the starting level GPT entry is a block descriptor or a table descriptor (if the type ID field 196 has the value indicating a table descriptor entry 180, then the entry is a table descriptor entry 180, and otherwise the entry is a block descriptor entry 200). If the starting level GPT entry is a block descriptor entry 200 then at step 246 the GPI for the target PA is extracted from the GPI field 194 which is at a position corresponding to the target PA (e.g. some bits PA[15:12] of the target PA can be used to select which GPI field to use) and then the extracted GPI is returned to the PAS filtering circuitry 20 to perform the check for whether the memory access request is allowed as described in step 174 of FIG. 10.

If the starting level GPT entry is a table descriptor then at step 248 the variable nesting control parameter NL 190 and the next level table pointer 193 are extracted from the starting level GPT entry obtained at step 242. At step 250, the next level of the table structure becomes the "current level" for the purpose of subsequent steps of FIG. 13. Hence, in the case where step 250 is reached after step 248, the next level will become the level which is one level beyond the starting level, e.g. level 1 in the example of FIG. 12 where the starting level is level 0. A loop through steps 252 to 260 begins which is performed for each subsequent level of the table structure that is reached in the traversal, until eventually a block descriptor entry 200 is identified and the traversal ends.

At step 252, the size and position of the current level offset portion used to index into the current level of the GPT is determined based on the variable nesting control parameter NL 190 and the current level. This is done in accordance with the offset equations shown in the table above for respective levels SL+1, SL+2 and SL+3. Hence, the size and condition of the offset portion for a given level varies depending upon the variable nesting control parameters specified at an earlier level of the table and can differ for different sub-trees depending on which physical address is being accessed.

At step 254 the current level GPT entry is read from memory following an address determined by adding a pointer 193 read from the previous level of the table and a multiple of the current level offset portion of the target physical address determined at step 252 (the multiple being based on the size of one GPT entry). At step 256, when the current level GPT entry has been returned from the memory system then the GPT walk circuitry determines whether the current level GPT entry is a block descriptor entry 200 or a table descriptor entry 180. Again, if it is a block descriptor entry then at step 258 the GPI for the target PA is returned the same as at step 246. However, if the current level GPT entry is a table descriptor entry 180 then at step 260 the next level pointer 193 is obtained from the current level GPT entry and the method returns to step 250 to proceed to the next level of the table structure and loop through steps 252 to 256 again for the next level of the table structure. The method continues until eventually a block descriptor entry 200 is identified and the method ends at step 258.

Although not shown in FIG. 13, the GPT walk circuitry 23 may also have circuitry for identifying errors in the GPT walk, such as invalidly encoded GPT entries, or a case where having reached level 3 of the table the entry read from the indexed position of the level 3 table is still not a block descriptor entry. If any such errors are identified, a fault can be signalled, to be handled by the root domain code at EL3.

Figure 14:
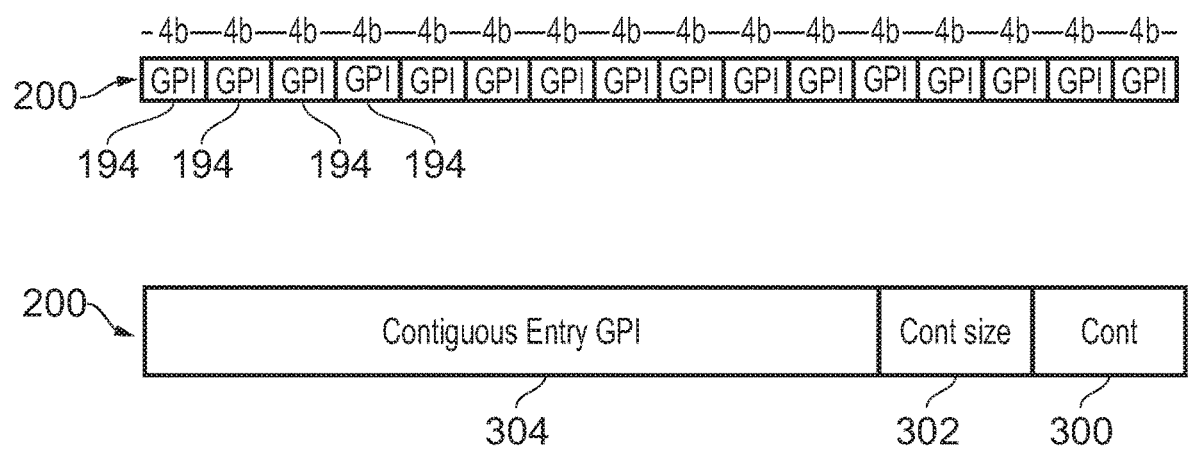
FIG. 14 illustrates an example of representing access control information for a contiguous block of adjacent granules of addresses using a shared set of access control information.

FIG. 14 shows how a number of GPT entries can be grouped together by specifying a contiguous indicator 300 so that the GPI information for all the granules of physical addresses represented by two or more different GPT entries 200 can be cached in the granule protection information cache 22 as a single entry, to increase the coverage of the cache and hence increase cache hit rates and therefore performance. In the example of FIG. 14, the block descriptor entries 200 for granules which are not grouped together as a contiguous entry have the same format as shown in FIG. 11. However, the GPI field at the least significant bits [3:0] of the block descriptor entry functions as a "pivot" GPI which can have special encoding values for specifying unified entries which use the 64-bit entry to provide a property common to all granules that are mapped to that entry. The format of the unified contiguous entry is shown in the lower part of FIG. 14, in which in addition to the contiguity indicator 300 which is in the pivot GPI position and has an encoding which would otherwise be invalid for the other GPIs, the contiguous GPT block descriptor format also specifies a contiguity size parameter 202 and GPI information 304 for the contiguous entry.

The contiguity indication 300 allows gathering multiple table entries to form a large block. The size parameter 302 specifies the size of the contiguous block of physical addresses that the entry is part of. The GPI protection attributes for the contiguous block are specified in remaining bits 304 of the block descriptor entry 200.

For example, in the worked example above, a block descriptor entry at the maximum permitted table level (L1 for NL=1, L2 for NL=2 or L3 for NL=3) would normally specify the attributes for 64 KB of physical address space. However, with the contiguity indicator set, this 64 KB block could be defined to be part of a 512 MB contiguous block that has a single set of GPI attributes. Hence, all 8192 individual block descriptor entries for the 512 MB contiguous block may have their GPT entries in memory set to specify the contiguity entry 300, the contiguity size parameter 302 identify a size of 512 MB, and identical GPI information in the GPI field 304. This means that, whichever address in that 512 MB is accessed first, the corresponding GPT entry can then be cached, and the cache lookup mechanism of the granule protection information cache 22 may ensure that any address in that 512 MB block is then considered to hit against the single cached entry, to return the shared protection attributes from the GPI field 304 when any address in the 512 MB is accessed even though only a single cache entry in the granule protection information cache 22 is occupied. This frees up many other cache entries for caching GPT entries for other addresses, improving cache utilisation.

The example of FIG. 14 shows an approach where the contiguity indicator 300 is indicated using an invalid encoding for a particular GPI field 194 within the block descriptor table entry 200 (e.g. the GPI field at the least significant bits of the blocked descriptor table entry). However, this is not essential and other approaches may provide a dedicated field in the block descriptor table entry 200 for specifying whether or not the entry is part of a contiguous block or not. Hence, it is not essential to represent the contiguity indication in the way shown in FIG. 14.

FIGS. 11 to 14 illustrate properties of the GPT structure including the variable nesting controlled by the nesting level parameter NL in the starting level table entry, and the contiguity indication 300 which allows entries for a large block to be fused together. These are particularly useful for the GPT, but could also be applied to other types of access control table for controlling access to memory, such as the page table structure used by the address translation circuitry 16. Hence, the techniques shown in FIGS. 11 to 13 could also be used by the page table walk circuitry 17 when performing a page table walk to identify address translation mappings. The page table walk circuitry 17 could use variably defined offset portions for indexing into respective levels of the table structure depending on a variable nesting control parameter NL defined in a higher level access control table than the table whose offset portion is being determined. While the GPT is an inverted page table indexed by physical address, similar techniques could also be used for a non-inverted page table indexed by virtual address, so as to trade off the size of the table data itself against the number of accesses to memory required to reach the protection information associated with a particular address.

Figure 15:
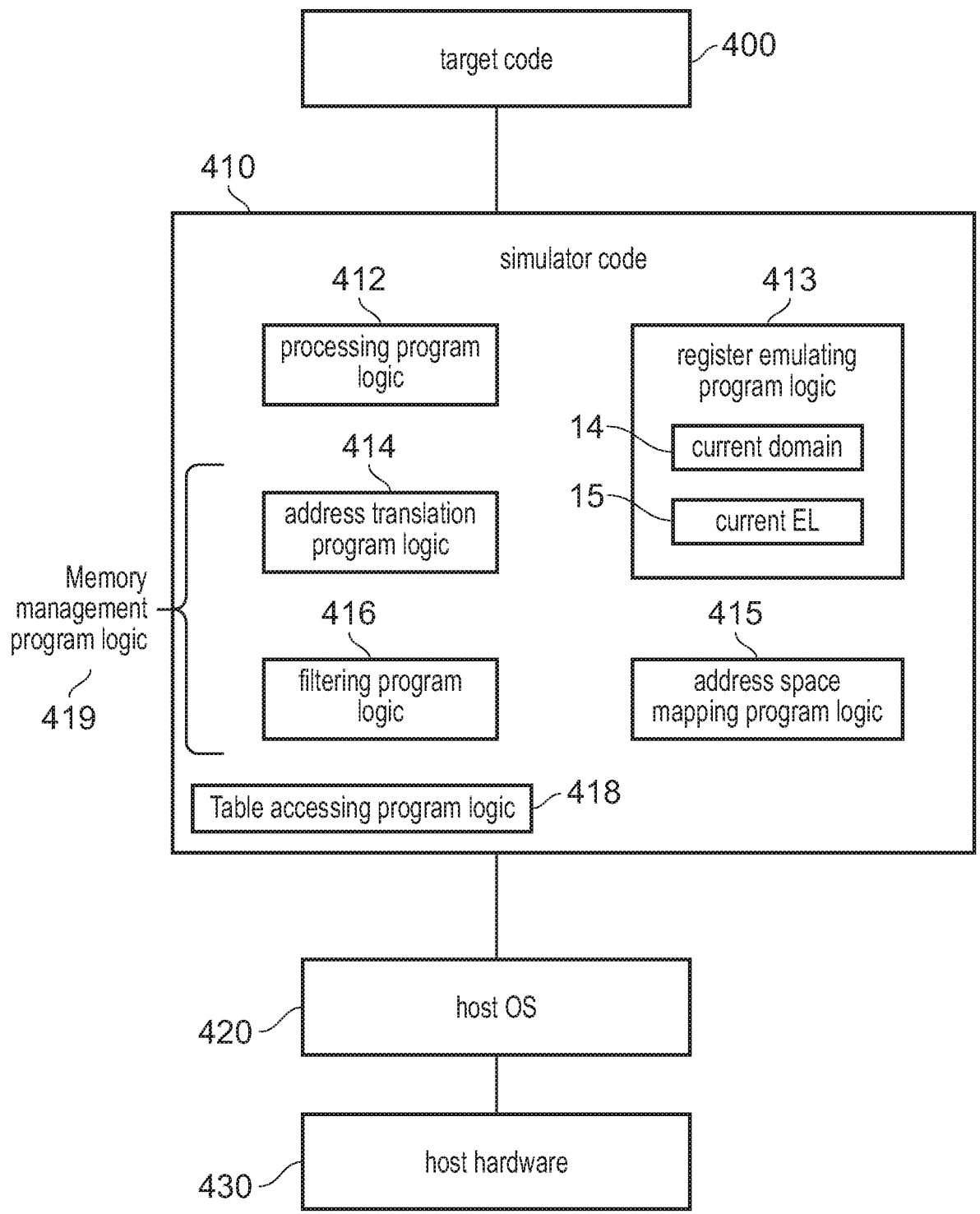
FIG. 15 illustrates a simulator example.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400 may be executed from within the instruction execution environment using the simulator program 410, so that a host computer 430 which does not actually have the hardware features of the apparatus 2 discussed above can emulate these features. This can be useful, for example, for allowing testing of target code 400 being developed for a new version of a processor architecture before hardware devices actually supporting that architecture are yet available, as the target code can be tested by running within the simulator executing on a host device which does not support that architecture.

The simulator code includes processing program logic 412 which emulates the behaviour of the processing circuitry 10, e.g. including instruction decoding program logic which decodes instructions of the target code 400 and maps the instructions to corresponding sequences of instructions in the native instruction set supported by the host hardware 430 to execute functions equivalent to the decoded instructions. The processing program logic 412 also simulates processing of code in different exception levels and domains as described above. Register emulating program logic 413 maintains a data structure in a host address space of the host processor, which emulates architectural register state defined according to the target instruction set architecture associated with the target code 400. Hence, instead of such architectural state being stored in hardware registers 12 as in the example of FIG. 1, it is instead stored in the memory of the host processor 430, with the register emulating program logic 413 mapping register references of instructions of the target code 400 to corresponding addresses for obtaining the simulated architectural state data from the host memory. This architectural state may include the current domain indication 14 and current exception level indication 15 described earlier.

The simulation code includes address translation program logic 414 and filtering program logic 416 (both of which are examples of memory management program logic 419) which emulate the functionality of the address translation circuitry 16 and PAS filter 20 respectively, with reference to the same page table structures and GPT 56 as described earlier. Hence, the address translation program logic 414 translates virtual addresses specified by the target code 400 into simulated physical addresses in one of the PASs (which from the point of view of the target code refer to physical locations in memory), but actually these simulated physical addresses are mapped onto the (virtual) address space of the host processor by address space mapping program logic 415. The filtering program logic 416 performs a lookup of granule protection information to determine whether to allow memory accesses triggered by the target code to proceed, in the same way as the PAS filter described above.

Table accessing program logic 418 emulates the functionality of the page table walk circuitry 17 and GPT walk circuitry 23 to control loading of page table entries and GPT entries from simulated memory (mapped to the virtual address space of the host processor by the address space mapping program logic 415). However, for the simulator, the TLB 18 and granule protection information cache 22 may not be simulated, so the simulator embodiment would behave similar to a hardware device that does not have any TLB 18 or GPI cache 22. Hence, each memory access request would be treated as if it misses in the cache, so a page table walk and/or GPT walk may be required for each memory access. As in the hardware embodiment, for the simulated embodiment the page table structure and/or the GPT structure may be implemented with variable nesting with the size/position of offset portions selected based on the NL parameter 190 specified in a higher-level table entry. In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
memory management circuitry to control access to a memory system based on access control information defined in table entries of a table structure comprising a plurality of levels of access control table; and
table accessing circuitry to access the table structure to obtain the access control information corresponding to a target address; in which:
for a given access control table at a given level of the table structure other than a starting level:
the table accessing circuitry is configured to select a selected table entry of the given access control table corresponding to the target address, based on an offset portion of the target address, the selected table entry providing either a pointer to an access control table at a next lowest level of the table structure or the access control information corresponding to the target address; and
the table accessing circuitry is configured to determine a size of the offset portion of the target address based on a variable nesting control parameter specified in a table entry of a higher-level access control table at a higher level of the table structure than the given access control table.

2. The apparatus according to claim 1, in which the variable nesting control parameter is specified separately in respective table entries of the higher-level access control table.

3. The apparatus according to claim 2, in which when different table entries of the higher-level access control table specify different values for the variable nesting control parameter, a size of the offset portion used by the table accessing circuitry to select the selected table entry is different for different access control tables at the given level of the table structure.

4. The apparatus according to claim 1, in which a maximum number of levels of the table structure to be traversed to reach the table entry providing the access control information corresponding to the target address is variable depending on the variable nesting control parameter.

5. The apparatus according to claim 1, in which a table size of the given access control table is variable depending on the variable nesting control parameter.

6. The apparatus according to claim 1, in which for the given access control table at the given level of the table structure:
each table entry defines information applicable to a range of addresses of a given address range size; and
the given address range size is variable depending on the variable nesting control parameter specified in the table entry of the higher-level access control table.

7. The apparatus according to claim 1, in which the variable nesting control parameter is specified in a table entry of a starting-level access control table at the starting level of the table structure.

8. The apparatus according to claim 1, in which the table accessing circuitry is configured to obtain the access control information corresponding to the target address from a block-descriptor table entry in an access control table at a final level of the table structure reached in a traversal of the table structure, the block-descriptor table entry specifying the access control information for a target granule of addresses including the target address.

9. The apparatus according to claim 8, in which the block-descriptor table entry comprises a plurality of access control information fields, each for indicating the access control information for a different granule of addresses.

10. The apparatus according to claim 8, in which: when the block-descriptor table entry specifies a contiguity indication, the table accessing circuitry is configured to determine that the access control information for two or more different granules of addresses including the target granule is represented by a shared set of access control information shared between the two or more different granules.

11. The apparatus according to claim 10, in which when the block-descriptor table entry specifies a contiguity indication, the table accessing circuitry is configured to identify how many granules share the shared set of access control information based on a contiguity size parameter specified in the block-descriptor table entry.

12. The apparatus according to claim 10, in which the block-descriptor table entry comprises a plurality of access control information fields, each for indicating the access control information for a respective granule of addresses;
the block-descriptor table entry specifies the contiguity indication when a predetermined one of the plurality of access control information fields has a predetermined encoding other than an encoding in a set of valid encodings for indicating valid options for the access control information; and
when the predetermined one of the plurality of access control information fields has the predetermined encoding, the shared set of access control information is indicated by one or more other access control information fields in the block-descriptor table entry corresponding to the target address or another block-descriptor table entry.

13. The apparatus according to claim 1, in which the table structure is indexed by physical address.

14. The apparatus according to claim 1 in which the memory management circuitry comprises:
address translation circuitry to translate a target virtual address specified by a memory access request into a target physical address associated with a selected physical address space selected from among a plurality of physical address spaces; and
filtering circuitry to determine whether the memory access request should be allowed to access the target physical address, based on whether the access control information obtained from the table structure indicates that the selected physical address space is an allowed physical address space for the target physical address.

15. The apparatus according to claim 1, in which the table structure is indexed by virtual address.

16. The apparatus according to claim 1, in which the memory management circuitry comprises address translation circuitry to translate a target virtual address specified by a memory access request into a target physical address based on an address translation mapping indicated by the access control information obtained from the table structure.

17. A method comprising:
controlling access to a memory system based on access control information defined in table entries of a table structure comprising a plurality of levels of access control table; and
accessing the table structure to obtain the access control information corresponding to a target address; in which:
for a given access control table at a given level of the table structure other than a starting level:
a selected table entry of the given access control table corresponding to the target address is selected based on an offset portion of the target address, the selected table entry providing either a pointer to an access control table at a next lowest level of the table structure or the access control information corresponding to the target address; and
a size of the offset portion of the target address is determined based on a variable nesting control parameter specified in a table entry of a higher-level access control table at a higher level of the table structure than the given access control table.

18. A non-transitory, computer-readable storage medium storing a computer program comprising instructions which, when executed on a host data processing apparatus, control the host data processing apparatus to provide an instruction execution environment for execution of target code; the computer program comprising:
memory management program logic to control access to simulated memory based on access control information defined in table entries of a table structure comprising a plurality of levels of access control table; and
table accessing program logic to access the table structure to obtain the access control information corresponding to a target simulated address; in which:
for a given access control table at a given level of the table structure other than a starting level:
the table accessing program logic is configured to select a selected table entry of the given access control table corresponding to the target simulated address, based on an offset portion of the target simulated address, the selected table entry providing either a pointer to an access control table at a next lowest level of the table structure or the access control information corresponding to the target simulated address; and
the table accessing program logic is configured to determine a size of the offset portion of the target simulated address based on a variable nesting control parameter specified in a table entry of a higher-level access control table at a higher level of the table structure than the given access control table.

19. The apparatus according to claim 1, in which the table accessing circuitry is configured to obtain, from the memory system, the table entry of the higher-level access control table which specifies the variable nesting control parameter.

20. The apparatus according to claim 19, in which the table entry of the higher-level access control table obtained from the memory system specifies both the variable nesting control parameter and the pointer to the access control table at the next lowest level of the table structure.

* * * * *